US012100893B2

(12) United States Patent
Jia

(10) Patent No.: US 12,100,893 B2
(45) Date of Patent: Sep. 24, 2024

(54) ANTENNA APPARATUS AND ELECTRONIC DEVICE

(71) Applicant: GUANGDONG OPPO MOBILE TELECOMMUNICATIONS CORP., LTD., Guangdong (CN)

(72) Inventor: Yuhu Jia, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 211 days.

(21) Appl. No.: 17/704,208

(22) Filed: Mar. 25, 2022

(65) Prior Publication Data

US 2022/0216615 A1 Jul. 7, 2022

Related U.S. Application Data

(63) Continuation of application No. PCT/CN2020/122464, filed on Oct. 21, 2020.

(30) Foreign Application Priority Data

Oct. 22, 2019 (CN) .......................... 201911011137.6

(51) Int. Cl.
*H01Q 15/00* (2006.01)
*H01Q 1/42* (2006.01)
(Continued)

(52) U.S. Cl.
CPC ........... *H01Q 15/0006* (2013.01); *H01Q 1/42* (2013.01); *H01Q 5/307* (2015.01); *H01Q 9/0414* (2013.01)

(58) Field of Classification Search
CPC ...... H01Q 15/0006; H01Q 1/42; H01Q 5/307; H01Q 9/0414
(Continued)

(56) References Cited

U.S. PATENT DOCUMENTS 6,323,825 B1 * 11/2001 Zidek ................. H01Q 15/0026 343/753
6,483,481 B1 11/2002 Sievenpiper et al.
(Continued)

FOREIGN PATENT DOCUMENTS

CN 102880899 1/2013
CN 103633431 3/2014
(Continued)

OTHER PUBLICATIONS

"3rd Generation Partnership Project; Technical Specification Group Radio Access Network; NR; User Equipment (UE) radio transmission and reception; Part 3: Range 1 and Range 2 Interworking operation with other radios (Release 15)," 3GPP TS 38.101-3, Jun. 2018, v15.2.0.

(Continued)

*Primary Examiner* — Graham P Smith
*Assistant Examiner* — Amal Patel
(74) *Attorney, Agent, or Firm* — Hodgson Russ LLP

(57) ABSTRACT

An antenna apparatus is provided. The antenna apparatus includes an antenna module and the antenna radome. The antenna module is configured to receive/emit a first radio frequency (RF) signal in a first preset frequency band in a first preset direction range and receive/emit a second RF signal in a second preset frequency band in a second preset direction range, where the first preset frequency band is lower than the second preset frequency band, and the first preset direction range and the second preset direction range have an overlapped region. An antenna radome is spaced apart from the antenna module and includes a substrate and a resonant structure carried on the substrate, where the resonant structure is at least partially located in the overlapped region. The resonant structure at least has in-phase
(Continued)

reflection characteristics to the first RF signal and in-phase reflection characteristics to the second RF signal.

18 Claims, 22 Drawing Sheets

(51) Int. Cl.
*H01Q 5/307* (2015.01)
*H01Q 9/04* (2006.01)

(58) Field of Classification Search
USPC .......................................................... 343/872
See application file for complete search history.

(56) References Cited

U.S. PATENT DOCUMENTS

| | | | | |
|---|---|---|---|---|
| 11,552,405 | B1 * | 1/2023 | Bily | H01Q 21/061 |
| 2004/0239577 | A1 * | 12/2004 | Delgado | H01Q 1/422<br>343/872 |
| 2006/0097935 | A1 | 5/2006 | Colburn et al. | |
| 2006/0232479 | A1 | 10/2006 | Walton | |
| 2012/0112980 | A1 | 5/2012 | Kaikkonen et al. | |
| 2012/0325544 | A1 * | 12/2012 | Toyao | H05K 1/0236<br>174/266 |
| 2013/0222200 | A1 * | 8/2013 | Ju | H01Q 15/0013<br>343/833 |
| 2013/0285880 | A1 | 10/2013 | Zaghloul et al. | |
| 2013/0323579 | A1 * | 12/2013 | Hwang | H01Q 15/0013<br>156/242 |
| 2014/0118217 | A1 * | 5/2014 | Cannon | H01Q 1/425<br>343/872 |
| 2015/0295308 | A1 * | 10/2015 | Liu | H01Q 1/525<br>343/841 |
| 2016/0087349 | A1 | 3/2016 | Lee et al. | |
| 2018/0017664 | A1 * | 1/2018 | Toyao | G01S 7/03 |
| 2018/0342789 | A1 | 11/2018 | Jiang et al. | |
| 2019/0122978 | A1 * | 4/2019 | Tang | H01L 23/485 |
| 2019/0190140 | A1 * | 6/2019 | Lavin | H01Q 1/422 |
| 2019/0386364 | A1 * | 12/2019 | Liang | H01Q 15/0086 |
| 2020/0295452 | A1 * | 9/2020 | Yamada | G01S 13/931 |
| 2021/0044029 | A1 * | 2/2021 | Yoon | H01Q 1/38 |
| 2021/0083398 | A1 * | 3/2021 | Ko | H01Q 21/061 |
| 2022/0285850 | A1 * | 9/2022 | Ma | H01Q 13/10 |

FOREIGN PATENT DOCUMENTS

| | | |
|---|---|---|
| CN | 104979642 | 10/2015 |
| CN | 109066080 | 12/2018 |
| EP | 1451899 | 9/2004 |
| EP | 2028715 | 2/2009 |
| EP | 3194898 | 7/2017 |
| EP | 3772131 | 2/2021 |
| WO | 2019151796 | 8/2019 |

OTHER PUBLICATIONS

"3rd Generation Partnership Project; Technical Specification Group Radio Access Network; NR; User Equipment (UE) radio transmission and reception; Part 2: Range 2 Standalone (Release 17)," 3GPP TS 38.101-2, Sep. 2021, v17.3.0.

"3rd Generation Partnership Project; Technical Specification Group Radio Access Network; Study on New Radio Access Technology; RF and co-existence aspects (Release 14)," 3GPP TR 38.803, Oct. 2016, v0.2.0/.

Shi, "Design of Low Profile Dipole Antenna Based on Artificial Magnetic Conductor," Master's Degree Thesis, Shunan University, Apr. 2016.

Feng, "Research on Broadband Antenna Based on Artificial Magnetic Conductor," Master's Degree Thesis, Harbin Institute of Technology, Jul. 2016.

Wang, "Research on the Structure of Artificial Magnetic Conductor and its Application in Antenna," Master's Degree Thesis, Nanjing University of Science and Technology, 2012.

WIPO, International Search Report for PCT/CN2020/122464, Jan. 12, 2021.

Ullah et al., "A new metasurface reflective structure for simultaneous enhancement of antenna bandwidth and gain," Smart Materials and Structures, 2014, vol. 23.

EPO, Extended European Search Report for EP Application No. 20878828.1, Oct. 24, 2022.

Zhang, "The Design and Study of EBG Antennas," Master's Degree Thesis, Harbin Engineering University, 2015.

Wang et al., "Dual-Band High Efficiency Terahertz Meta-Devices Based on Reflective Geometric Metasurfaces," IEEE Access, Apr. 2019, vol. 7.

CNIPA, First Office Action for CN Application No. 201911011137.6, Dec. 16, 2022.

* cited by examiner

ANTENNA APPARATUS AND ELECTRONIC DEVICE

CROSS-REFERENCE TO RELATED APPLICATIONS

The present application is a continuation of International Application No. PCT/CN2020/122464, filed Oct. 21, 2020, which claims priority to Chinese Patent Application No. 201911011137.6, filed Oct. 22, 2019, the entire disclosures of which are incorporated herein by reference.

TECHNICAL FIELD

This disclosure relates to the field of electronic devices, and in particular to an antenna apparatus and an electronic device.

BACKGROUND

With development of mobile communication technology, the traditional 4th-generation (4G) mobile communication can no longer meet people's requirements. The 5th-generation (5G) mobile communication is favored by users for its high communication speed. For example, a data transmission speed in the 5G mobile communication is hundreds of times faster than that in the 4G mobile communication. The 5G mobile communication is mainly implemented via millimeter wave (mmWave) signals. However, when an mmWave antenna is applied to an electronic device, the mmWave antenna is usually disposed in an accommodation space in the electronic device, and an mmWave signal radiated out through the electronic device has a poor gain, resulting in poor communication performance of 5G mmWave signals.

SUMMARY

An antenna apparatus and an electronic device are provided in the present disclosure.

In a first aspect, an antenna apparatus is provided in the present disclosure. The antenna apparatus includes an antenna module and an antenna radome. The antenna module is configured to receive/emit a first radio frequency (RF) signal in a first preset frequency band in a first preset direction range and receive/emit a second RF signal in a second preset frequency band in a second preset direction range, where the first preset frequency band is lower than the second preset frequency band, and the first preset direction range and the second preset direction range have an overlapped region. The antenna radome is spaced apart from the antenna module and includes a substrate and a resonant structure carried on the substrate, where the resonant structure is at least partially located in the overlapped region, and the resonant structure at least has in-phase reflection characteristics to the first RF signal and in-phase reflection characteristics to the second RF signal.

In a second aspect, an electronic device is provided in the present disclosure. The electronic device includes a controller and the antenna apparatus in the first aspect of the present disclosure. The antenna apparatus is electrically connected with the controller, and the antenna module in the antenna apparatus is configured to emit a first RF signal and a second RF signal under control of the controller.

BRIEF DESCRIPTION OF THE DRAWINGS

In order to describe technical solutions of implementations of the present disclosure more clearly, the following will give a brief introduction to the accompanying drawings used for describing the implementations. Apparently, the accompanying drawings hereinafter described are merely some implementations of the present disclosure. Based on these drawings, those of ordinary skill in the art can also obtain other drawings without creative effort.

DETAILED DESCRIPTION

Figure 1:
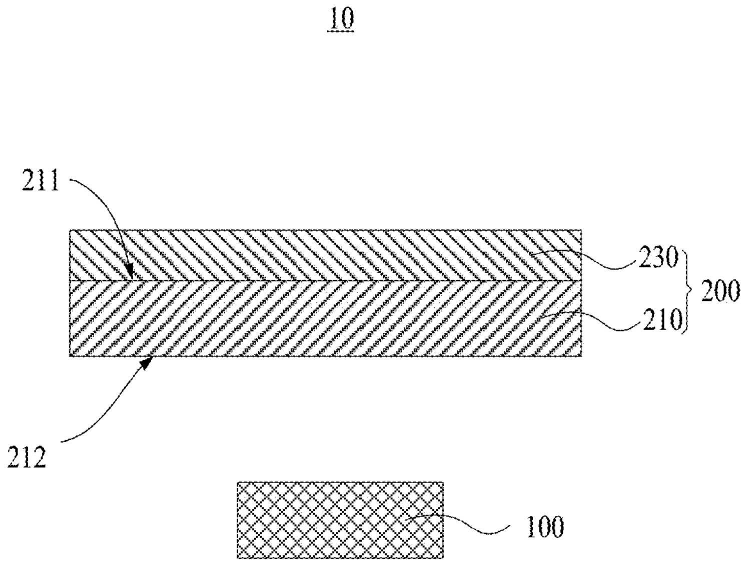
FIG. 1 is a cross-sectional view of an antenna apparatus provided in an implementation of the present disclosure.

In a first aspect, an antenna apparatus is provided in implementations of the present disclosure. The antenna apparatus includes an antenna module and an antenna radome. The antenna module is configured to receive/emit a first radio frequency (RF) signal in a first preset frequency band in a first preset direction range and receive/emit a second RF signal in a second preset frequency band in a second preset direction range, where the first preset frequency band is lower than the second preset frequency band, and the first preset direction range and the second preset direction range have an overlapped region. The antenna radome is spaced apart from the antenna module and includes a substrate and a resonant structure carried on the substrate, where the resonant structure is at least partially located in the overlapped region. The resonant structure at least has in-phase reflection characteristics to the first RF signal and in-phase reflection characteristics to the second RF signal.

In an implementation, the resonant structure at least satisfies:

$$\left(\frac{\phi_{R1}}{\pi}-1\right)\frac{\lambda_1}{4}+N\frac{\lambda_1}{2}=\left(\frac{\phi_{R2}}{\pi}-1\right)\frac{\lambda_2}{4}+N\frac{\lambda_2}{2},$$

where $\phi_{R1}$ represents a difference between a reflection phase and an incident phase brought by the resonant structure to the first RF signal, $\lambda_1$ represents a wavelength of the first RF signal in air, $\phi_{R2}$ represents a difference between a reflection phase and an incident phase brought by the resonant structure to the second RF signal, $\lambda_2$ represents a wavelength of the second RF signal in air, and Nis a positive integer.

In an implementation, the resonant structure includes a first sub-resonant structure and a second sub-resonant structure spaced apart from the first sub-resonant structure, the first sub-resonant structure has in-phase reflection characteristics to the first RF signal, and the second resonant structure has in-phase reflection characteristics to the second RF signal.

In an implementation, the resonant structure includes a first resonant layer and a second resonant layer stacked with the first resonant layer, the first resonant layer is farther away from the antenna module than the second resonant layer. The first resonant layer includes first resonant units arranged at regular intervals, the first resonant unit includes a first resonant patch, the second resonant layer includes second resonant units arranged at regular intervals, the second resonant unit includes a second resonant patch, the first resonant patch and the second resonant patch are disposed on two opposite sides of the substrate, respectively. An orthographic projection of the second resonant patch on a plane where the first resonant patch is located at least partially overlaps with a region where the first resonant patch is located, the first resonant patch and the second resonant patch are conductive patches, and the following is satisfied: $L_{low\_f} \leq W_{low\_f}$, where $W_{low\_f}$ represents a side length of the first resonant patch, $L_{low\_f}$ represents a side length of the second resonant patch, and the first sub-resonant structure at least includes the first resonant patch and the second resonant patch.

In an implementation, the resonant structure includes a first resonant layer and a second resonant layer stacked with the first resonant layer, the first resonant layer is farther away from the antenna module than the second resonant layer. The first resonant layer includes first resonant units arranged at regular intervals, the first resonant unit includes a first resonant patch, the second resonant layer includes second resonant units arranged at regular intervals, the second resonant unit includes a second resonant patch, the first resonant patch and the second resonant patch are disposed on two opposite sides of the substrate, respectively. An orthographic projection of the second resonant patch on a plane where the first resonant patch is located at least partially overlaps with a region where the first resonant patch is located, the first resonant patch is a conductive patch, the second resonant patch is a conductive patch and defines a first hollow structure penetrating two opposite surfaces of the second resonant patch, and the following is satisfied: $L_{low\_f} \geq W_{low\_f}$, where $W_{low\_f}$ represents a side length of the first resonant patch, $L_{low\_f}$ represents a side length of the second resonant patch, a difference between $W_{low\_f}$ and $L_{low\_f}$ increases as an area of the first hollow structure increases, and the first sub-resonant structure at least includes the first resonant patch and the second resonant patch.

In an implementation, the first resonant unit includes a third resonant patch spaced apart from the first resonant patch, a side length of the third resonant patch is less than the side length of the first resonant patch. The second resonant unit includes a fourth resonant patch spaced apart from the second resonant patch, a side length of the fourth resonant patch is less than the side length of the second resonant patch, the fourth resonant patch and the third resonant patch are disposed on two opposite sides of the substrate, respectively. An orthographic projection of the fourth resonant patch on a plane where the third resonant patch is located at least partially overlaps with a region where the third resonant patch is located, the third resonant patch and the fourth resonant patch are conductive patches, and the following is satisfied: $L_{high\_f} \leq W_{high\_f}$, where $W_{high\_f}$ represents the side length of the third resonant patch, $L_{high\_f}$ represents the side length of the fourth resonant patch, and the second sub-resonant structure at least includes the third resonant patch and the fourth resonant patch.

In an implementation, the first resonant unit includes a third resonant patch spaced apart from the first resonant patch, a side length of the third resonant patch is less than the side length of the first resonant patch. The second resonant unit includes a fourth resonant patch spaced apart from the second resonant patch, a side length of the fourth resonant patch is less than the side length of the second resonant patch. The fourth resonant patch and the third resonant patch are disposed on two opposite sides of the substrate, respectively, an orthographic projection of the fourth resonant patch on a plane where the third resonant patch is located at least partially overlaps with a region where the third resonant patch is located, the third resonant patch is a conductive patch, the fourth resonant patch is a conductive patch and defines a second hollow structure penetrating two opposite surfaces of the fourth resonant patch, and the following is satisfied: $L_{high\_f} \geq W_{high\_f}$, where $W_{high\_f}$ represents the side length of the third resonant patch, $L_{high\_f}$ represents the side length of the fourth resonant patch, a difference between $L_{high\_f}$ and $W_{high\_f}$ increases as an area of the second hollow structure increases, and the second sub-resonant structure at least includes the third resonant patch and the fourth resonant patch.

In an implementation, the first resonant unit further includes another first resonant patch and another third resonant patch, the two first resonant patches are diagonally arranged and spaced apart from each other, the side length of the third resonant patch is less than the side length of the first resonant patch, and the two third resonant patches are arranged diagonally and spaced apart from each other.

In an implementation, a center of the two first resonant patches as a whole coincides with a center of the two third resonant patches as a whole.

In an implementation, the second resonant unit further includes another second resonant patch and another fourth resonant patch, the two second resonant patches are diagonally arranged and spaced apart from each other, and the two fourth resonant patches are diagonally arranged and spaced apart from each other.

In an implementation, a center of the two second resonant patches as a whole coincides with a center of the two fourth resonant patches as a whole.

In an implementation, a center of the first resonant patch is electrically connected with a center of the second resonant patch via a conductive member.

In an implementation, the resonant structure includes multiple first conductive lines spaced apart from one another and multiple second conductive lines spaced apart from one another. The multiple first conductive lines are intersected with the multiple second conductive lines, and the multiple first conductive lines are electrically connected with the multiple second conductive lines at intersections.

In an implementation, the resonant structure includes multiple conductive grids arranged in arrays, each of the multiple conductive grids is enclosed by at least one conductive line, and two adjacent conductive grids at least partially share the conductive line.

In an implementation, a distance between of a radiation surface of the resonant structure facing the antenna module and a radiation surface of the antenna module satisfies:

$$h = \left(\frac{\phi_{R1}}{\pi} - 1\right)\frac{\lambda_1}{4} + N\frac{\lambda_1}{2},$$

where h represents a length of a line segment of a center line of the radiation surface of the antenna module from the radiation surface of the antenna module to a surface of the resonant structure facing the antenna module, the center line is a straight line perpendicular to the radiation surface of the antenna module, $\phi_{R1}$ represents a difference between a reflection phase and an incident phase brought by the resonant structure to the first RF signal, $\lambda_1$ represents a wavelength of the first RF signal in air, and Nis a positive integer.

In an implementation, when $\phi_{R1}=0$, a minimum distance h between the radiation surface of the resonant structure facing the antenna module and the radiation surface of the antenna module is equal to $\lambda_1/4$.

In an implementation, a maximum value $D_{max}$ of a directivity coefficient of the antenna module satisfies:

$$D_{max} = \frac{1 + R_1}{1 - R_1},$$

where $R_1=S_{11}^2$, and $S_{11}$ represents an amplitude of a reflection coefficient of the antenna radome to the first RF signal.

In an implementation, the preset frequency band at least includes a full frequency band of 3rd generation partnership project (3GPP) millimeter wave (mmWave).

In a second aspect, an electronic device is provided in implementations of the present disclosure. The electronic device includes a controller and the antenna apparatus provided in any of the implementations in the first aspect. The antenna apparatus is electrically connected with the controller, and the antenna module in the antenna apparatus is configured to emit a first RF signal and a second RF signal under control of the controller.

In an implementation, the electronic device includes a battery cover, and the substrate at least includes the battery cover. The resonant structure is directly disposed on an inner surface of the battery cover; or the resonant structure is attached to the inner surface of the battery cover via a carrier film; or the resonant structure is directly disposed on an outer surface of the battery cover; or the resonant structure is attached to the outer surface of the battery cover via a carrier film; or part of the resonant structure is disposed on the inner surface of the battery cover, and part of the resonant structure is disposed on the outer surface of the battery cover; or the resonant structure is partially embedded in the battery cover.

In an implementation, the electronic device further includes a screen. The substrate at least includes the screen, the screen includes a cover plate and a display module stacked with the cover plate, and the resonant structure is located between the cover plate and the display module.

In the implementations of the present disclosure, the antenna apparatus and the electronic device are provided to overcome a technical problem that traditional millimeter wave signals have poor communication performance.

Technical solutions of implementations of the present disclosure will be described clearly and completely with reference to accompanying drawings in the implementations of the present disclosure. Apparently, implementations described herein are merely some rather than all implementations of the present disclosure. Based on the implementations of the present disclosure, all other implementations obtained by those of ordinary skill in the art without creative effort shall fall within the protection scope of the present disclosure.

Reference is made to FIG. 1, which is a cross-sectional view of an antenna apparatus provided in an implementation of the present disclosure. An antenna apparatus 10 includes an antenna module 100 and an antenna radome 200. The antenna module 100 is configured to receive/emit a first radio frequency (RF) signal in a first preset frequency band in a first preset direction range and receive/emit a second RF signal in a second preset frequency band in a second preset direction range. The first preset frequency band is lower than the second preset frequency band, and the first preset direction range and the second preset direction range have an overlapped region. The antenna radome 200 is spaced apart from the antenna module 100 and includes a substrate 210 and a resonant structure 230 carried on the substrate 210. The resonant structure 230 is at least partially located in the overlapped region. The resonant structure 230 at least has in-phase reflection characteristics to the first RF signal and in-phase reflection characteristics to the second RF signal. It can be understood, the resonant structure 230 at least has the in-phase reflection characteristics to the first RF signal and the in-phase reflection characteristics to the second RF signal, which means that the resonant structure 230 has in-phase reflection characteristics to the first RF signal and has in-phase reflection characteristics to the second RF signal, or means that in addition to having in-phase reflection characteristics to the first RF signal and the second RF signal, the resonant structure 230 also has in-phase reflection characteristics to other RF signals other than the first RF signal and the second RF signal (that is, the resonant structure 230 has in-phase reflection characteristics to multiple RF signals).

The first RF signal may be, but is not limited to, an RF signal in an mmWave frequency band or an RF signal in a terahertz (THz) frequency band. Currently, in the 5th generation (5G) wireless systems, according to the 3rd generation partnership project (3GPP) technical specification (TS) 38.101 protocol, 5G new radio (NR) mainly uses two frequency bands: a frequency range 1 (FR1) band and a frequency range 2 (FR2) band. The FR1 band has a frequency range of 450 megahertz (MHz)~6 gigahertz (GHz), and is also known as the sub-6 GHz band. The FR2 band has a frequency range of 24.25 Ghz-52.6 Ghz, and belongs to the mmWave frequency band. The 3GPP Release 15 specifies that the present 5G mmWave frequency bands include: n257 (26.5~29.5 Ghz), n258 (24.25~27.5 Ghz), n261 (27.5~28.35 Ghz), and n260 (37~40 GHz). Correspondingly, the second RF signal may be, but is not limited to, an RF signal in an mmWave frequency band or an RF signal in a THz frequency band. In an implementation, the first preset frequency band of the first RF signal may be band n261, and the second preset frequency band of the second RF signal may be band n260. In other implementations, the first preset frequency band of the first RF signal may be band n260, and the second preset frequency band of the second RF signal may be band n261. Of course, the first preset frequency band and the second preset frequency band may also be other frequency bands, as long as the first preset frequency band is different from the second preset frequency band. Generally, band n261 has a resonance frequency point of 28 GHz, and band n260 has a resonance frequency band of 39 GHz.

The resonant structure 230 is carried on the substrate 210. The resonant structure 230 can be disposed corresponding to the entire substrate 210, and can also be disposed corresponding to part of the substrate 210. As illustrated in the schematic view of this implementation, for example, the resonant structure 230 is carried on the substrate 210 and disposed corresponding to the entire substrate 210. The first preset direction range can be exactly the same as the second preset direction range. The first preset direction range can also be different from the second preset direction range, as long as the first preset direction range and the second preset direction range have an overlapped region and the resonant structure is at least partially located in the overlapped region.

The resonant structure 230 has in-phase reflection characteristics to the first RF signal, which means that when the first RF signal is incident on the resonant structure 230, a reflection phase of the first RF signal is the same as an incident phase of the first RF signal, or means that the reflection phase of the first RF signal is not equal to the incident phase of the first RF signal but a difference between the reflection phase of the first RF signal and the incident phase of the first RF signal is within a first preset phase range, so that the first RF signal can penetrate the antenna radome 200. Generally, the first preset phase range is −90° ~0 and 0~+90°. In other words, when the first RF signal is incident on the resonant structure 230, and the difference between the reflection phase of the first RF signal and the incident phase of the first RF signal is in a range of −90° ~+90°, the resonant structure 230 has the in-phase reflection characteristics to the first RF signal.

Correspondingly, the resonant structure 230 has in-phase reflection characteristics to the second RF signal, which means that when the second RF signal is incident on the resonant structure 230, a reflection phase of the second RF signal is the same as an incident phase of the second RF signal, or means that the reflection phase of the second RF signal is not equal to the incident phase of the second RF signal but a difference between the reflection phase of the second RF signal and the incident phase of the second RF signal is within a second preset phase range, so that the second RF signal can penetrate the antenna radome 200. It should be noted that the first preset phase range may be the same as or different from the second preset phase range. Generally, the second preset phase range is −90° ~0 and 0~+90°. In other words, when the second RF signal is incident on the resonant structure 230, and the difference between the reflection phase of the second RF signal and the incident phase of the second RF signal is in a range of −90° ~+90°, the resonant structure 230 has the in-phase reflection characteristics to the second RF signal.

The resonant structure 230 in the antenna apparatus 10 of this implementation has the in-phase reflection characteristics to the first RF signal in the first preset frequency band, and the first RF signal in the first preset frequency band can pass through the resonant structure 230. Correspondingly, the resonant structure 230 also has the in-phase reflection characteristics to the second RF signal in the second preset frequency band, and the second RF signal in the second preset frequency band can pass through the resonant structure 230. In this way, the antenna apparatus 10 can operate in two frequency bands. Further, the first RF signal and the second RF signal have good directivity and high gain after passing through the antenna radome 200 (see a simulation diagram in FIG. 39 and related description). That is, the resonant structure 230 can compensate for losses of the first RF signal and the second RF signal during transmission, so that the first RF signal and the second RF signal can communicate over longer distances. Therefore, the antenna apparatus 10 of the present disclosure is beneficial to improving communication performance of the electronic device to which the antenna apparatus 10 is applied.

Further, the substrate 210 has a first surface 211 and a second surface 212 opposite to the first surface 211. The first surface 211 is farther away from the antenna module 100 than the second surface 212. In this implementation, the resonant structure 230 is disposed on the first surface 211.

Figure 2:
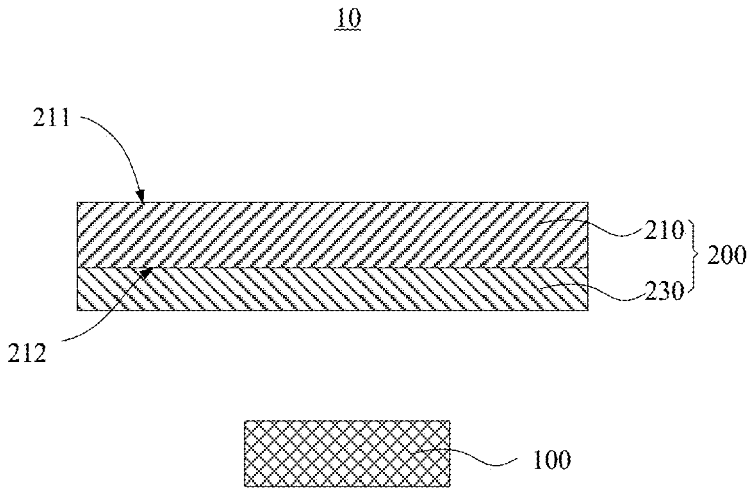
FIG. 2 is a cross-sectional view of an antenna apparatus provided in an implementation of the present disclosure.

Reference is made to FIG. 2, which is a cross-sectional view of an antenna apparatus provided in an implementation of the present disclosure. An antenna apparatus 10 includes an antenna module 100 and an antenna radome 200. The antenna module 100 is configured to receive/emit a first RF signal in a first preset frequency band in a first preset direction range and receive/emit a second RF signal in a second preset frequency band in a second preset direction range. The first preset frequency band is lower than the second preset frequency band. The first preset direction range and the second preset direction range have an overlapped region. The antenna radome 200 is spaced apart from the antenna module 100 and includes a substrate 210 and a resonant structure 230 carried on the substrate 210. The resonant structure 230 is at least partially located in the overlapped region. The resonant structure 230 has in-phase reflection characteristics to the first RF signal and in-phase reflection characteristics to the second RF signal.

Further, the substrate 210 has a first surface 211 and a second surface 212 opposite to the first surface 211. The first surface 211 is farther away from the antenna module 100 than the second surface 212. In this implementation, the resonant structure 230 is disposed on the second surface 212.

Figure 3:
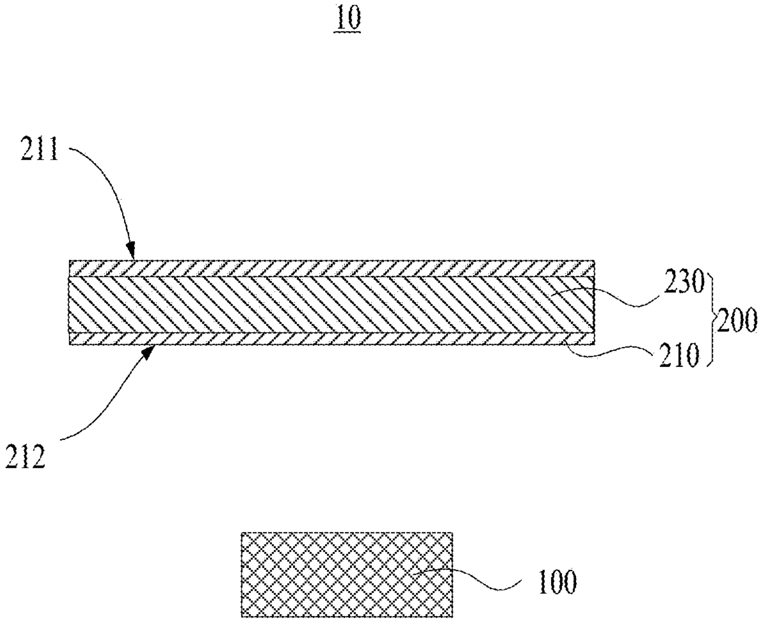
FIG. 3 is a cross-sectional view of an antenna apparatus provided in an implementation of the present disclosure.

Reference is made to FIG. 3, which is a cross-sectional structural view of an antenna apparatus provided in an implementation of the present disclosure. An antenna apparatus 10 includes an antenna module 100 and an antenna radome 200. The antenna module 100 is configured to receive/emit a first RF signal in a first preset frequency band in a first preset direction range and receive/emit a second RF signal in a second preset frequency band in a second preset direction range. The first preset frequency band is lower than the second preset frequency band. The first preset direction range and the second preset direction range have an overlapped region. The antenna radome 200 is spaced apart from the antenna module 100 and includes a substrate 210 and a resonant structure 230 carried on the substrate 210. The resonant structure 230 is at least partially located in the overlapped region. The resonant structure 230 has in-phase reflection characteristics to the first RF signal and in-phase reflection characteristics to the second RF signal.

Further, the substrate 210 has a first surface 211 and a second surface 212 opposite to the first surface 211. The first surface 211 is farther away from the antenna module 100 than the second surface 212. In this implementation, the resonant structure 230 is embedded in the substrate 210 and between the first surface 211 and the second surface 212.

Figure 4:
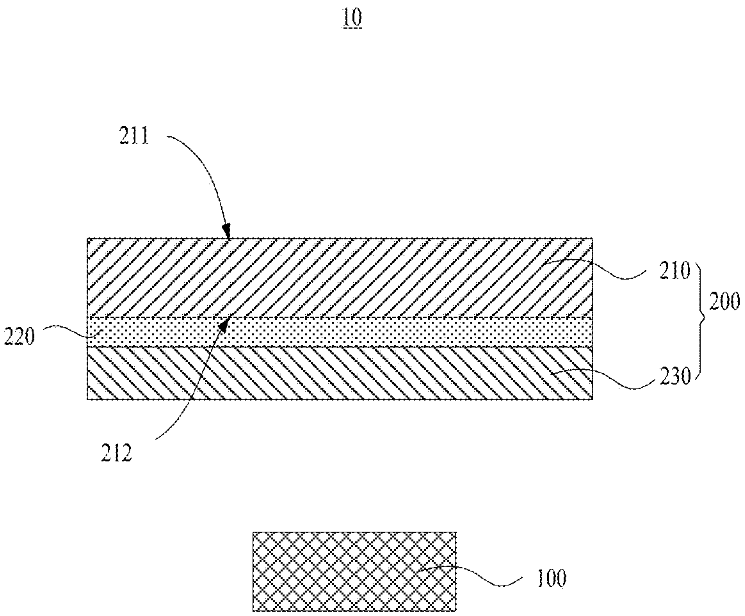
FIG. 4 is a cross-sectional view of an antenna apparatus provided in an implementation of the present disclosure.

Reference is made to FIG. 4, which is a cross-sectional view of an antenna apparatus provided in an implementation of the present disclosure. An antenna apparatus 10 includes an antenna module 100 and an antenna radome 200. The antenna module 100 is configured to receive/emit a first RF signal in a first preset frequency band in a first preset direction range and receive/emit a second RF signal in a second preset frequency band in a second preset direction range. The first preset frequency band is lower than the second preset frequency band. The first preset direction range and the second preset direction range have an overlapped region. The antenna radome 200 is spaced apart from the antenna module 100 and includes a substrate 210 and a resonant structure 230 carried on the substrate 210. The resonant structure 230 is at least partially located in the overlapped region. The resonant structure 230 has in-phase reflection characteristics to the first RF signal and in-phase reflection characteristics to the second RF signal.

Further, the resonant structure 230 is attached to a carrier film 220, and the carrier film 220 is adhered to the substrate 210. In a case that the resonant structure 230 is attached to the carrier film 220, the carrier film 220 may be, but not limited to, a polyethylene terephthalate (PET) film, a flexible circuit board, a printed circuit board, and the like. The PET film can be, but not limited to, a color film, an explosion-proof film, and the like. The substrate 210 has a first surface 211 and a second surface 212 opposite to the first surface 211. The first surface 211 is farther away from the antenna module 100 than the second surface 212. As illustrated in the schematic view of this implementation, for example, the resonant structure 230 is adhered to the second surface 212 via the carrier film 220. It should be noted that in other implementations, the resonant structure 230 can also be adhered to the first surface 211 via the carrier film 220.

Figure 5:
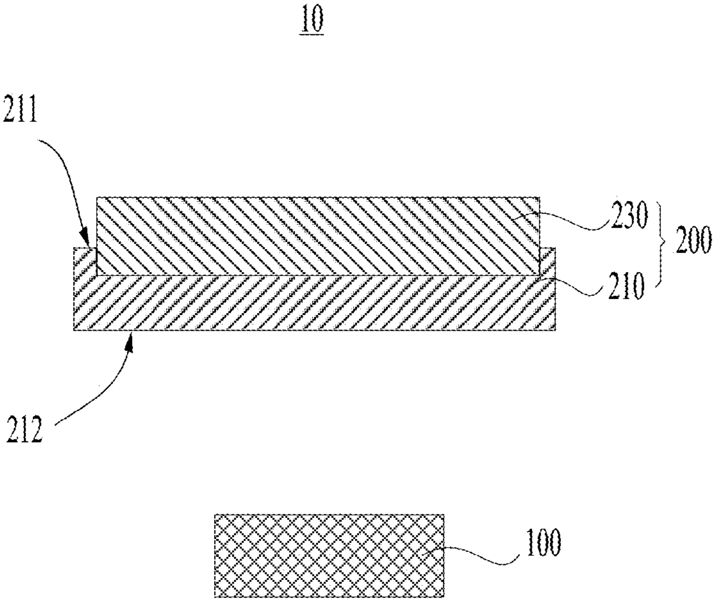
FIG. 5 is a cross-sectional view of an antenna apparatus provided in an implementation of the present disclosure.

Reference is made to FIG. 5, which is a cross-sectional view of an antenna apparatus provided in an implementation of the present disclosure. An antenna apparatus 10 includes an antenna module 100 and an antenna radome 200. The antenna module 100 is configured to receive/emit a first RF signal in a first preset frequency band in a first preset direction range and receive/emit a second RF signal in a second preset frequency band in a second preset direction range. The first preset frequency band is lower than the second preset frequency band. The first preset direction range and the second preset direction range have an overlapped region. The antenna radome 200 is spaced apart from the antenna module 100 and includes a substrate 210 and a resonant structure 230 carried on the substrate 210. The resonant structure 230 is at least partially located in the overlapped region. The resonant structure 230 has in-phase reflection characteristics to the first RF signal and in-phase reflection characteristics to the second RF signal.

Further, the substrate 210 has a first surface 211 and a second surface 212 opposite to the first surface 211. The first surface 211 is farther away from the antenna module 100 than the second surface 212. Part of the resonant structure 230 is exposed to the outside of the first surface 211, and the rest of the resonant structure 230 is embedded in the substrate 210.

It should be noted that, in other implementations, part of the resonant structure 230 is disposed on the first surface 211 of the substrate 210 and part of the resonant structure 230 is disposed on the second surface 212 of the substrate 210. Part of the resonant structure 230 is disposed on the first surface 211 of the substrate 210 as follows: part of the resonant structure 230 is directly disposed on the first surface 211 of the substrate 210, or part of the resonant structure 230 is adhered to the second surface 211 via the carrier film 220. Correspondingly, part of the resonant structure 230 is disposed on the second surface 212 of the substrate 210 as follows: part of the resonant structure 230 is disposed on the second surface 212 of the substrate 210, or part of the resonant structure 230 is adhered to the second surface via the carrier film 220.

In combination with the antenna apparatus 10 provided in any of the foregoing implementations, the resonant structure 230 is made of a metal material or a non-metal conductive material. In a case that the resonant structure 230 is made of a non-metal conductive material, the resonant structure 230 may be transparent or non-transparent. The resonant structure 230 may be integrated or non-integrated.

In combination with the antenna apparatus 10 provided in any of the foregoing implementations, the substrate 210 is made of at least one of or a combination of plastics, glass, sapphire, and ceramics.

Figure 6:
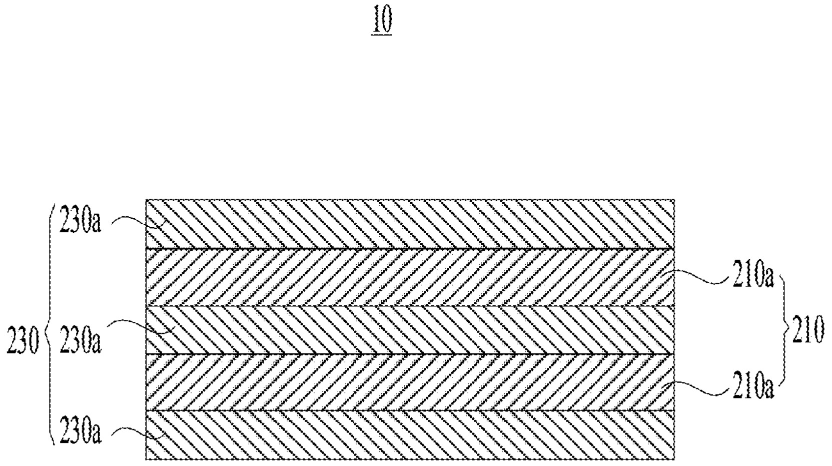
FIG. 6 is a cross-sectional view of a resonant structure provided in an implementation of the present disclosure.

Reference is made to FIG. 6, which is a cross-sectional view of the resonant structure provided in an implementation of the present disclosure. The resonant structure 230 can be incorporated into the antenna apparatus 10 provided in any of the foregoing implementations. The resonant structure 230 includes one or more resonant layers 230*a*. In a case that the resonant structure 230 includes multiple resonant layers 230*a*, the multiple resonant layers 230*a* are stacked in a preset direction and spaced apart from one another. In a case that the resonant structure 230 includes multiple resonant layers 230*a*, a dielectric layer 210*a* is sandwiched between two adjacent resonant layers 230*a*, and the outermost resonant layer 230*a* may or may not be covered with a dielectric layer 210*a*. All dielectric layers 210*a* constitute the substrate 210. In the schematic view of this implementation, for example, the resonant structure 230 includes three resonant layers 230*a* and two dielectric layers 210*a*. Optionally, the preset direction is parallel to a main lobe direction of the first RF signal or a main lobe direction of the second RF signal. In a case that the preset direction is parallel to the main lobe direction of the first RF signal, the first RF signal has good radiation performance. The preset direction refers to a direction of a beam with the maximum radiation intensity in the first RF signal.

Figure 7:
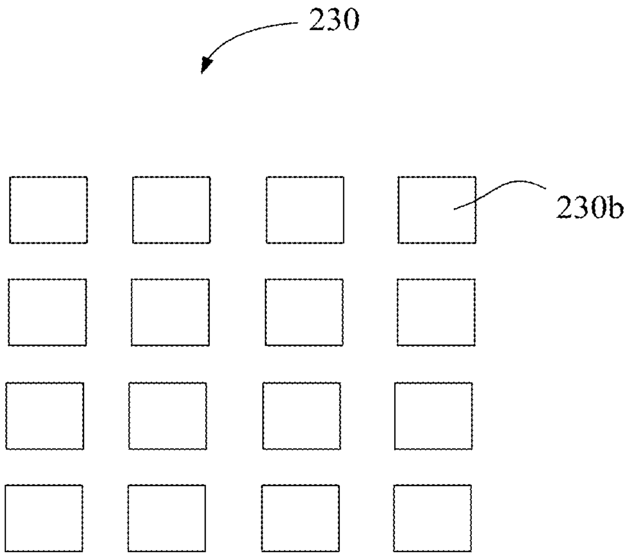
FIG. 7 is a schematic view of an arrangement of resonant structures provided in an implementation of the present disclosure.

Reference is made to FIG. 7, which is a schematic view illustrating an arrangement of resonant structures provided in an implementation of the present disclosure. A resonant structure 230 may be incorporated into the antenna apparatus 10 provided in any of the foregoing implementations. The resonant structure 230 includes multiple resonant units 230*b* arranged at regular intervals. Regular-interval arrangement of the multiple resonant units 230*b* makes the resonant structure 230 easier to be manufactured.

Figure 8:
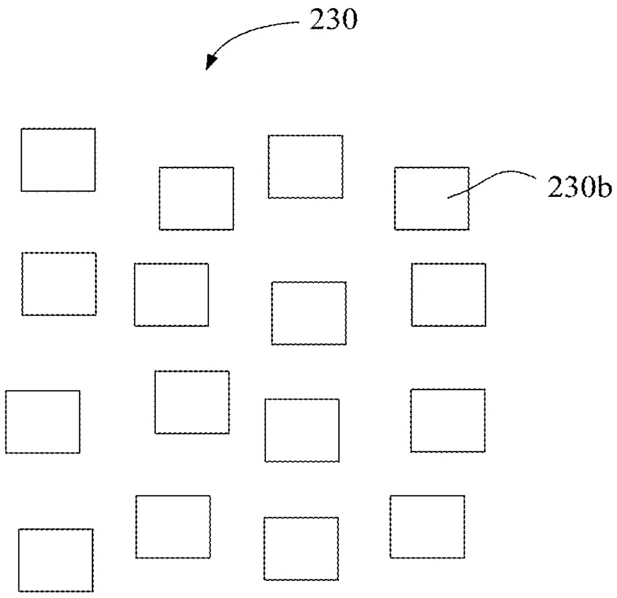
FIG. 8 is a schematic view of an arrangement of resonant structures provided in an implementation of the present disclosure.

Reference is made to FIG. 8, which is a schematic view illustrating an arrangement of resonant structures provided in an implementation of the present disclosure. A resonant structure 230 may be incorporated into the antenna apparatus 10 provided in any of the foregoing implementations. The resonant structure 230 includes multiple resonant units 230*b* arranged at irregular intervals.

Optionally, in combination with the antenna apparatus 10 provided in any of the foregoing implementations, the resonant structure 230 at least satisfies:

$$\left(\frac{\phi_{R1}}{\pi}-1\right)\frac{\lambda_1}{4}+N\frac{\lambda_1}{2}=\left(\frac{\phi_{R2}}{\pi}-1\right)\frac{\lambda_2}{4}+N\frac{\lambda_2}{2}$$

where $\phi_{R1}$ represents a difference between a reflection phase and an incident phase brought by the resonant structure to the first RF signal, $\lambda_1$ represents a wavelength of the first RF signal in air, $\phi_{R2}$ represents a difference between a reflection phase and an incident phase brought by the resonant structure to the second RF signal, $\lambda_2$ represents a wavelength of the second RF signal in air, and Nis a positive integer.

For the first RF signal, a conventional ground system is a perfect electrical conductor (PEC), when the first RF signal is incident on the PEC, a phase difference of $-\pi$ will be generated. Therefore, for the first RF signal, a condition for the antenna radome 200 to realize resonance is:

$$h=\left(\frac{\phi_{R1}}{\pi}-1\right)\frac{\lambda_1}{4}+N\frac{\lambda_1}{2}$$

where $h_1$ represents a length of a line segment of a center line of a radiation surface of the antenna module 100 from a radiation surface of the antenna module 100 to a surface of the resonant structure 230 facing the antenna module 100, the center line is a straight line perpendicular to the radiation surface of the antenna module 100, $\phi_{R1}$ represents a difference between a reflection phase and an incident phase brought by the resonant structure 230 to the first RF signal, $\lambda_1$ represents a wavelength of the first RF signal in air, and N is a positive integer. When $\phi_{R1}=0$, the resonant structure 230 has in-phase reflection characteristics to the first RF signal, and $\lambda_1$ has the minimum value, that is, $$h_1=\frac{\lambda_1}{4},$$

so that the value of $\lambda_1$ is significantly reduced. As such, for the first RF signal, a distance from the radiation surface of the antenna module 100 to the surface of the resonant structure 230 facing the antenna module 100 is the minimum distance. Therefore, the antenna apparatus 10 can have a small thickness. In a case that the antenna apparatus 10 is applied to the electronic device, the electronic device can have a small thickness. In this implementation, selection of $h_1$ can improve directivity and a gain of a beam of the first RF signal, in other words, the resonant structure 230 can compensate for a loss of the first RF signal during transmission, such that the first RF signal can communicate over longer distances. Therefore, the antenna apparatus 10 of the present disclosure is beneficial to improving communication performance of the electronic device to which the antenna apparatus 10 is applied. In addition, compared with designing complex circuits to achieve the same technical effects in tradition technology, the resonant structure 230 in the antenna apparatus 10 of the present disclosure has a simple structure, which is beneficial to improving product competitiveness.

In this case, in addition resonance realized by the antenna radome 200, the maximum value of a directivity coefficient of the first RF signal radiated out through the antenna radome 200 satisfies $$D_{1max}=\frac{1+R_1}{1-R_1},$$

where $D_{1max}$ represents the directivity coefficient of the first RF signal, $R_1=S_{11}^2$, and $S_{11}$ represents a reflection coefficient of the first RF signal.

Correspondingly, for the second RF signal, when the second RF signal is incident on the PEC, a phase difference of $-\pi$ will be generated. Therefore, for the second RF signal, a condition for the antenna radome 200 to realize resonance is:

$$h_2=\left(\frac{\phi_{R2}}{\pi}-1\right)+N\frac{\lambda_2}{2}$$

where $h_2$ represents a length of a line segment of a center line of a radiation surface of the antenna module 100 from a radiation surface of the antenna module 100 to a surface of the resonant structure 230 facing the antenna module 100, the center line is a straight line perpendicular to the radiation surface of the antenna module 100, $\phi_{R2}$ represents a difference between a reflection phase and an incident phase brought by the resonant structure 230 to the second RF signal, $\lambda_2$ represents a wavelength of the second RF signal in air, and Nis a positive integer. When $\phi_{R1}=0$, the resonant structure 230 has in-phase reflection characteristics to the second RF signal $$h_2 = \frac{\lambda_2}{4},$$

so that the value of $\lambda_2$ is significantly reduced. As such, for the second RF signal, a distance from the radiation surface of the antenna module 100 to the surface of the resonant structure 230 facing the antenna module 100 is the minimum distance. Therefore, the antenna apparatus 10 can have a small thickness. In a case that the antenna apparatus 10 is applied to the electronic device, the electronic device can have a small thickness. In this implementation, selection of $h_2$ can improve directivity and a gain of a beam of the second RF signal, in other words, the resonant structure 230 can compensate for a loss of the second RF signal during transmission, such that the second RF signal can communicate over longer distances. Therefore, the antenna apparatus 10 of the present disclosure is beneficial to improving the communication performance of the electronic device to which the antenna apparatus 10 is applied. In addition, compared with designing complex circuits to achieve the same technical effects in tradition technology, the resonant structure 230 in the antenna apparatus 10 of the present disclosure has a simple structure, which is beneficial to improving product competitiveness.

In this case, in addition resonance realized by the antenna radome 200, the maximum value of a directivity coefficient of the second RF signal radiated out through the antenna radome 200 satisfies:

$$D_{2max} = \frac{1+R_2}{1-R_2},$$

where $D_{2\ max}$ represents the directivity coefficient of the second RF signal, $R_2=S'^2_{11}$, and $S'_{11}$ represents a reflection coefficient of the second RF signal.

In the antenna apparatus 10, $h_1=h_2$, therefore, the following is satisfied:

$$\left(\frac{\phi_{R1}}{\pi}-1\right)\frac{\lambda_1}{4}+N\frac{\lambda_1}{2}=\left(\frac{\phi_{R2}}{\pi}-1\right)\frac{\lambda_2}{4}+N\frac{\lambda_2}{2}$$

In this case, the resonant structure 230 has the in-phase reflection characteristics to the first RF signal and has the in-phase reflection characteristics to the second RF signal, thereby realizing dual-frequency in-phase reflection. Both the first RF signal and the second RF signal have large gains after passing through the antenna radome 200, and a distance between the antenna radome 200 and the antenna module 100 can be kept relatively small. When the antenna module 100 is applied to the electronic device 1 (referring to FIGS. 40 to 42), the thickness of the electronic device 1 to which the antenna module 100 is applied can be reduced.

Figure 9:
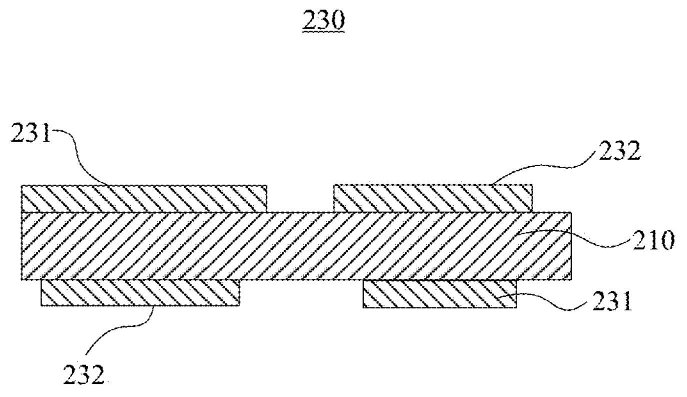
FIG. 9 is a cross-sectional view of a resonant structure provided in an implementation of the present disclosure.

Reference is made to FIG. 9, which is a cross-sectional view of a resonant structure provided in an implementation of the present disclosure. A resonant structure 230 may be incorporated into the antenna apparatus 10 provided in any of the foregoing implementations. The resonant structure 230 includes a first sub-resonant structure 231 and a second sub-resonant structure 232 spaced apart from the first sub-resonant structure 231. The first sub-resonant structure 231 has in-phase reflection characteristics to the first RF signal, and the second sub-resonant structure 232 has in-phase reflection characteristics to the second RF signal.

Specifically, the first sub-resonant structure 231 has the in-phase reflection characteristics to the first RF signal, which means that when the first RF signal is incident on the first sub-resonant structure 231, a reflection phase of the first RF signal is the same as an incident phase of the first RF signal, or means that the reflection phase of the first RF signal is not equal to the incident phase of the first RF signal but a difference between the reflection phase of the first RF signal and the incident phase of the first RF signal is within a first preset phase range, so that the first RF signal can penetrate the antenna radome 200. The first preset phase range can refer to the foregoing description, which will not be repeated herein.

Correspondingly, the second sub-resonant structure 232 has the in-phase reflection characteristics to the second RF signal, which means that when the second RF signal is incident on the second sub-resonant structure 232, a reflection phase of the second RF signal is the same as an incident phase of the second RF signal, or means that the reflection phase of the second RF signal is not equal to the incident phase of the second RF signal but a difference between the reflection phase of the second RF signal and the incident phase of the second RF signal is within a second preset phase range, so that the second RF signal can penetrate the antenna radome 200. The second preset phase range can refer to the foregoing description, which will not be repeated herein.

It should be noted that, the first sub-resonant structure 231 and the second sub-resonant structure 232 can be arranged at completely different layers. Alternatively, part of the first sub-resonant structure 231 and part of the second sub-resonant structure 232 are arranged at different layers, and the rest of the first sub-resonant structure 231 and the rest of the second sub-resonant structure 232 are arranged at the same layer.

The first sub-resonant structure 231 in the antenna apparatus 10 of this implementation has the in-phase reflection characteristics to the first RF signal in the first preset frequency band, and the first RF signal in the first preset frequency band can pass through the first sub-resonant structure 231. Correspondingly, the second sub-resonant structure 232 also has the in-phase reflection characteristics to the second RF signal in the second preset frequency band, and the second RF signal in the second preset frequency band can pass through the second sub-resonant structure 232. In this way, the antenna apparatus 10 can operate in two frequency bands, which is beneficial to improving the operation performance of the antenna apparatus 10.

Figure 10:
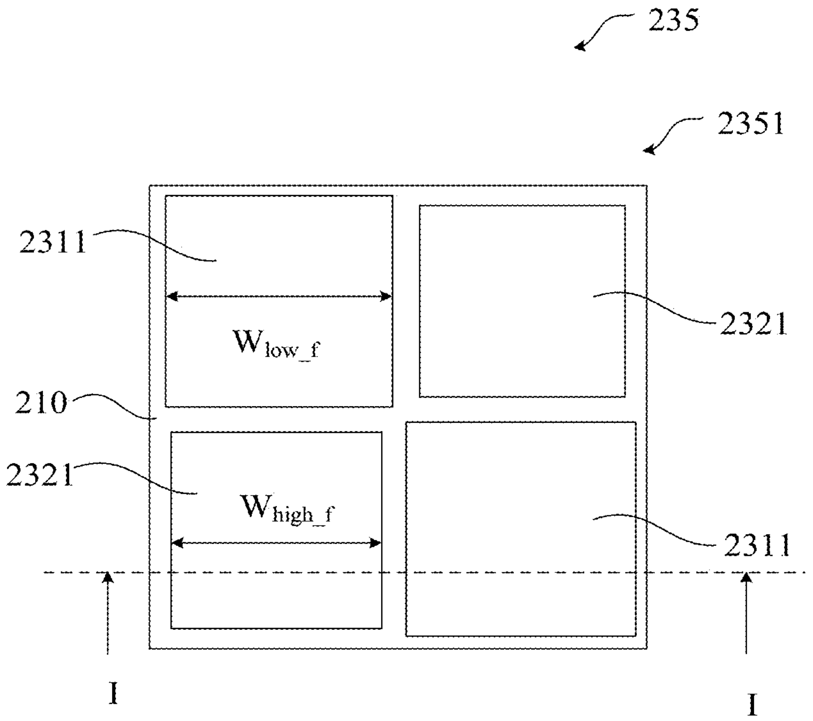
FIG. 10 is a top view of a resonant structure provided in an implementation of the present disclosure.
Figure 11:
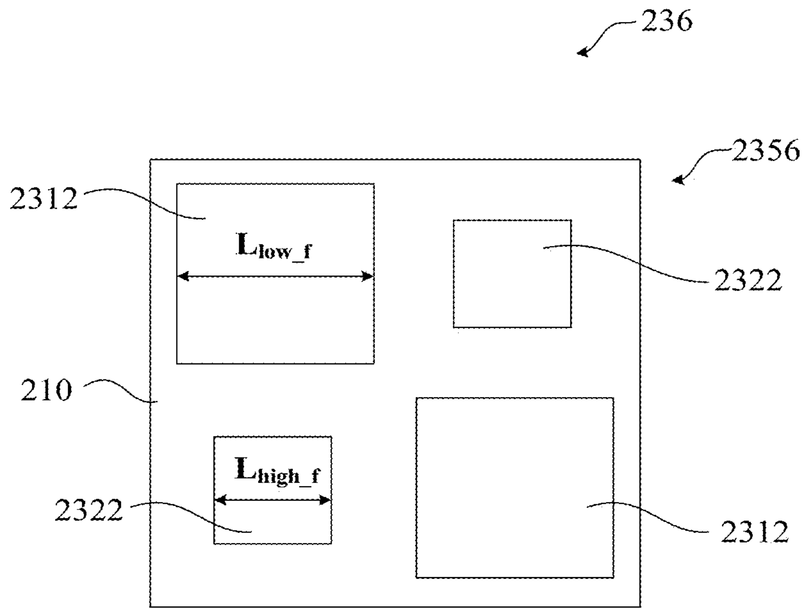
FIG. 11 is a bottom view of the resonant structure illustrated in FIG. 10.
Figure 12:
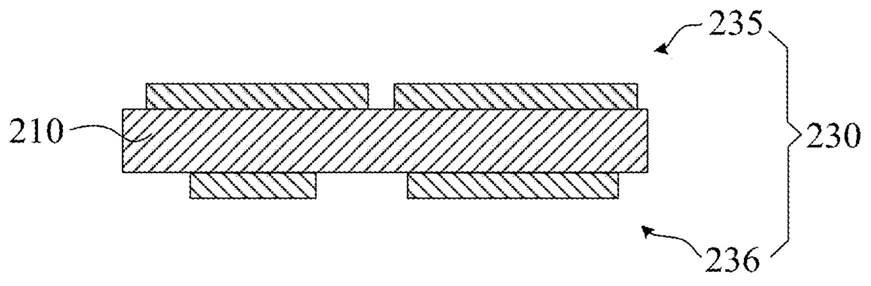
FIG. 12 is a cross-sectional view taken along line I-I in FIG. 10.

Reference is made to FIGS. 10-12, FIG. 10 is a top view of a resonant structure provided in an implementation of the present disclosure, FIG. 11 is a bottom view of the resonant structure illustrated in FIG. 10, and FIG. 12 is a cross-sectional view taken along line I-I in FIG. 10. In this implementation, the resonant structure 230 includes a first resonant layer 235 and a second resonant layer 236 stacked with the first resonant layer 235. It should be noted that, for ease of illustration of a correspondence between the first resonant layer 235 in FIG. 10 and the second resonant layer 236 in FIG. 11, the second resonant layer 236 in FIG. 11 is perspectively illustrated from the same top view angle as that of FIG. 10, and in FIG. 11, only the second resonant layer 236 and the substrate 210 are illustrated while the first resonant layer 235 is not illustrated. The first resonant layer 235 is farther away from the antenna module 100 than the second resonant layer 236. The first resonant layer 235 includes first resonant units 2351 arranged at regular intervals (one first resonant unit 2351 is illustrated in figures). The first resonant unit 2351 includes a first resonant patch 2311. The second resonant layer 236 includes second resonant units 2356 arranged at regular intervals (one second resonant unit 2356 is illustrated in figures). The second resonant unit 2356 includes a second resonant patch 2312. The first resonant patch 2311 is opposite to the second resonant patch 2312. The first resonant patch 2311 and the second resonant patch 2312 are conductive patches, and the following is satisfied:

$$L_{low\_f} \leq W_{low\_f}$$

where $W_{low\_f}$ represents a side length of the first resonant patch 2311, $L_{low\_f}$ represents a side length of the second resonant patch 2312, and the first sub-resonant structure 231 at least includes the first resonant patch 2311 and the second resonant patch 2312.

In this implementation, the first resonant patch 2311 is opposite to the second resonant patch 2312, which means that the first resonant patch 2311 and the second resonant patch 2312 are opposite to and at least partially overlap with each other. In other words, an orthographic projection of the second resonant patch 2312 on a plane where the first resonant patch 2311 is located at least partially overlaps with a region where the first resonant patch 2311 is located. Optionally, the orthographic projection of the second resonant patch 2312 on the plane where the first resonant patch 2311 is located falls into the region where the first resonant patch 2311 is located.

In this implementation, each of the first resonant patch 2311 and the second resonant patch 2312 is a conductive patch and does not define a hollow structure therein. Each of the first resonant patch 2311 and the second resonant patch 2312 can be in a shape of square, polygon, etc. In the schematic view of this implementation, for example, each of the first resonant patch 2311 and the second resonant patch 2312 is square. A structural form of the first sub-resonant structure 231 in this implementation can improve a gain of the first RF signal in the first preset frequency band.

Optionally, the first resonant unit 2351 includes a third resonant patch 2321 spaced apart from the first resonant patch 2311, a side length of the third resonant patch 2321 is less than the side length of the first resonant patch 2311. The second resonant unit 2356 includes a fourth resonant patch 2322 spaced apart from the second resonant patch 2312. A side length of the fourth resonant patch 2322 is less than the side length of the second resonant patch 2312. The fourth resonant patch 2322 is opposite to the third resonant patch 2321, the third resonant patch 2321 and the fourth resonant patch 2322 are conductive patches, and the following is satisfied:

$$L_{high\_f} \leq W_{high\_f}$$

where $W_{high\_f}$ represents the side length of the third resonant patch 2321, $L_{high\_f}$ represents the side length of the fourth resonant patch 2322, and the second sub-resonant structure 232 at least includes the third resonant patch 2321 and the fourth resonant patch 2322. A structural form of the second sub-resonant structure 232 in this implementation can improve a gain of the second RF signal in the second preset frequency band.

In this implementation, the fourth resonant patch 2322 is opposite to the third resonant patch 2321, which means that the fourth resonant patch 2322 and the third resonant patch 2321 are opposite to and at least partially overlap with each other. In other words, an orthographic projection of the fourth resonant patch 2322 on a plane where the third resonant patch 2321 is located at least partially overlaps with a region where the third resonant patch 2321 is located. Optionally, the orthographic projection of the fourth resonant patch 2322 on the plane where the third resonant patch 2321 is located falls into the region where the third resonant patch 2321 is located.

In this implementation, each of the third resonant patch 2321 and the fourth resonant patch 2322 is a conductive patch and does not define a hollow structure therein. Each of the third resonant patch 2321 and the fourth resonant patch 2322 can be in a shape of square, polygon, etc. In the schematic view of this implementation, for example, each of the third resonant patch 2321 and the fourth resonant patch 2322 is square. A structural form of the second sub-resonant structure 232 in this implementation can improve a gain of the second RF signal in the second preset frequency band.

Optionally, the first resonant unit 2351 further includes another first resonant patch 2311 and another third resonant patch 2321. The two first resonant patches 2311 are diagonally arranged and spaced apart from each other. The side length of the third resonant patch 2321 is less than the side length of the first resonant patch 2311. The two third resonant patches 2321 are arranged diagonally and spaced apart from each other. The resonant structure 230 in this implementation can further improve the gain of the first RF signal in the first preset frequency band.

Optionally, a center of the two first resonant patches 2311 coincides with a center of the two third resonant patches 2321. The resonant structure 230 in this implementation can further improve the gain of the first RF signal in the first preset frequency band.

Optionally, the second resonant unit 2356 further includes another second resonant patch 2312 and another fourth resonant patch 2322. The two second resonant patches 2312 are diagonally arranged and spaced apart from each other. The two fourth resonant patches 2322 are diagonally arranged and spaced apart from each other. The resonant structure 230 in this implementation can further improve the gain of the second RF signal in the second preset frequency band.

Optionally, a center of the two second resonant patches 2312 coincides with a center of the two fourth resonant patches 2322. The resonant structure 230 in this implementation can further improve the gain of the second RF signal in the second preset frequency band.

Figure 13:
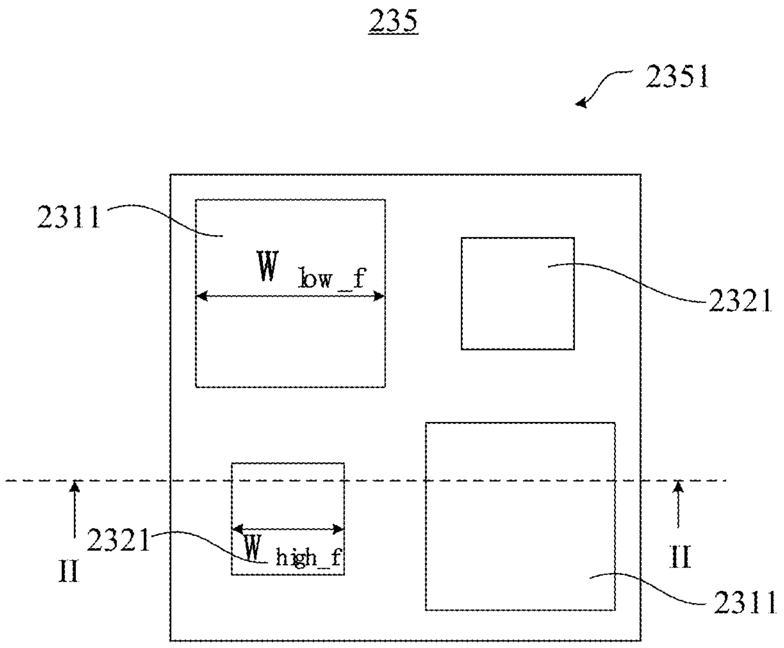
FIG. 13 is a top view of a resonant structure provided in an implementation of the present disclosure.
Figure 14:
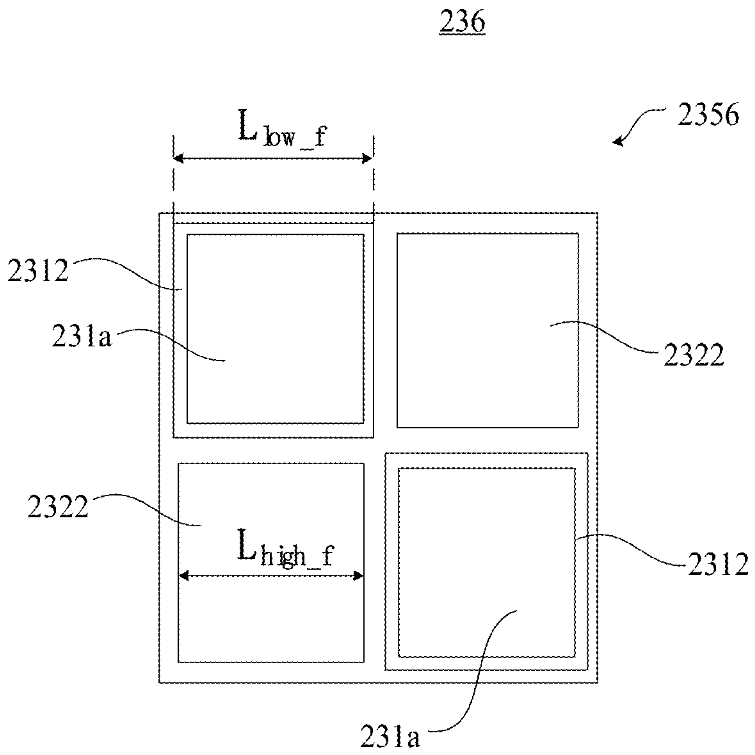
FIG. 14 is a bottom view of the resonant structure illustrated in FIG. 13.
Figure 15:
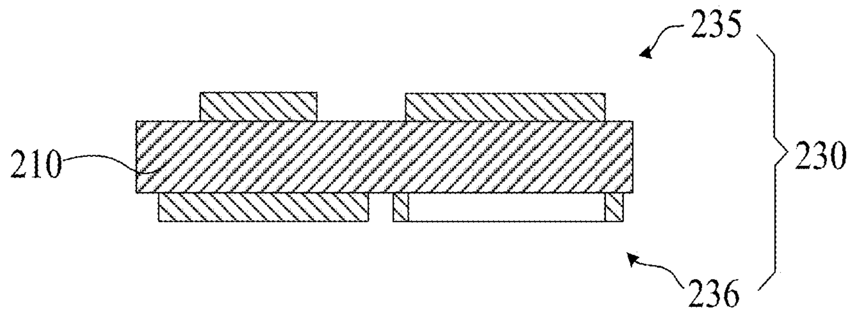
FIG. 15 is a cross-sectional view taken along line II-II in FIG. 13.

Reference is made to FIGS. 13-15, FIG. 13 is a top view of a resonant structure provided in an implementation of the present disclosure, FIG. 14 is a bottom view of the resonant structure illustrated in FIG. 13, and FIG. 15 is a cross-sectional view taken along line II-II in FIG. 13. In this implementation, the resonant structure 230 includes a first resonant layer 235 and a second resonant layer 236 stacked with the first resonant layer 235. It should be noted that, for ease of illustration of a correspondence between the first resonant layer 235 in FIG. 13 and the second resonant layer 236 in FIG. 14, the second resonant layer 236 in FIG. 14 is perspectively illustrated from the same top view angle as that of FIG. 13, and in FIG. 14, only the second resonant layer 236 and the substrate 210 are illustrated while the first resonant layer 235 is not illustrated. The first resonant layer 235 is farther away from the antenna module 100 than the second resonant layer 236. The first resonant layer 235 includes first resonant units 2351 arranged at regular intervals. The first resonant unit 2351 includes a first resonant patch 2311. The second resonant layer 236 includes second resonant units 2356 arranged at regular intervals. The second resonant unit 2356 includes a second resonant patch 2312. The first resonant patch 2311 is opposite to the second resonant patch 2312. The first resonant patch 2311 a conductive patch, the second resonant patch 2312 is a conductive patch and defines a first hollow structure 231*a* penetrating two opposite surfaces of the second resonant patch 2312, and the following is satisfied:

$$L_{low\_f} \leq W_{low\_f}$$

where $W_{low\_f}$ represents a side length of the first resonant patch 2311, $L_{low\_f}$ represents a side length of the second resonant patch 2312, a difference between $L_{low\_f}$ and $W_{low\_f}$ increases as an area of the first hollow structure 231*a* increases, and the first sub-resonant structure 231 at least includes the first resonant patch 2311 and the second resonant patch 2312.

In this implementation, the first resonant patch 2311 is opposite to the second resonant patch 2312, which means that the first resonant patch 2311 and the second resonant patch 2312 are opposite to and at least partially overlap with each other. In other words, an orthographic projection of the second resonant patch 2312 on a plane where the first resonant patch 2311 is located at least partially overlaps with a region where the first resonant patch 2311 is located. In this implementation, each of the first resonant patch 2311 and the second resonant patch 2312 can be in a shape of square, polygon, etc. In the schematic view of this implementation, for example, each of the first resonant patch 2311 and the second resonant patch 2312 is square, and the first hollow structure 231*a* is square. In other implementations, the first hollow structure 231*a* may also be in a shape of circle, ellipse, triangle, rectangle, hexagon, ring, cross, Jerusalem cross, or the like. A structural form of the first sub-resonant structure 231 in this implementation can improve a gain of the first RF signal in the first preset frequency band. Furthermore, compared with the second resonant patch 2312 without the first hollow structure 231*a*, a surface current distribution on the second resonant patch 2312 can be changed with the aid of the first hollow structure 231*a* which is defined in the second resonant patch 2312 and penetrates the two opposite surfaces of the second resonant patch 2312, which in turn increases an electrical length of the second resonant patch 2312. That is, for the first RF signal in the first preset frequency band, a size of the second resonant patch 2312 with the first hollow structure 231*a* is less than a side length of the second resonant patch 2312 without the first hollow structure 231*a*. Moreover, for the first RF signal in the first preset frequency band, the greater a hollow area of the first hollow structure 231*a*, the less the side length of the second resonant patch 2312, which is beneficial to improving an integration of the antenna radome 200.

Optionally, the first resonant unit 2351 includes a third resonant patch 2321 spaced apart from the first resonant patch 2311. The side length of the third resonant patch 2321 is less than the side length of the first resonant patch 2311. The second resonant unit 2356 includes a fourth resonant patch 2322 spaced apart from the second resonant patch 2356. A side length of the fourth resonant patch 2322 is less than the side length of the second resonant patch 2312. The fourth resonant patch 2322 is opposite to the third resonant patch 2321. An orthographic projection of the fourth resonant patch 2322 on a plane where the third resonant patch 2321 is located at least partially overlaps with a region where the third resonant patch 2321 is located. The third resonant patch 2321 and the fourth resonant patch 2322 are conductive patches, and the following is satisfied:

$$L_{high\_f} \leq W_{high\_f}$$

where $W_{high\_f}$ represents a side length of the third resonant patch 2321, $L_{high\_f}$ represents the side length of the fourth resonant patch 2322, and the second sub-resonant structure 232 at least includes the third resonant patch 2321 and the fourth resonant patch 2322. A structural form of the second sub-resonant structure 232 in this implementation can improve the gain of the second RF signal in the second preset frequency band.

Optionally, the first resonant unit 2351 further includes another first resonant patch 2311 and another third resonant patch 2321. The two first resonant patches 2311 are diagonally arranged and spaced apart from each other. The side length of the third resonant patch 2321 is less than the side length of the first resonant patch 2311. The two third resonant patches 2321 are arranged diagonally and spaced apart from each other. The resonant structure 230 in this implementation can further improve the gain of the first RF signal in the first preset frequency band.

Optionally, a center of the two first resonant patches 2311 as a whole coincides with a center of the two third resonant patches 2321 as a whole. The resonant structure 230 in this implementation can further improve the gain of the first RF signal in the first preset frequency band. It should be noted that the center of the two first resonant patches 2311 as a whole refers to the center of a "whole" with the two first resonant patches 2311 as a whole, rather than a center of each of the two first resonant patches 2311. For ease of description, the center of the "whole" of the two first resonant patches 2311 is denoted as a first center. The center of the two third resonant patches 2321 as a whole refers to the center of a "whole" with the two third resonant patches 2321 as a whole, rather than a center of each of the two third resonant patches 2321. For ease of description, the center of the "whole" of the two third resonant patches 2321 is denoted as the second center. The second center coincides with the first center.

Optionally, the second resonant unit 2356 further includes another second resonant patch 2312 and another fourth resonant patch 2322. The two second resonant patches 2312 are diagonally arranged and spaced apart from each other. The two fourth resonant patches 2322 are diagonally arranged and spaced apart from each other. The resonant structure 230 in this implementation can further improve the gain of the second RF signal in the second preset frequency band.

Optionally, a center of the two second resonant patches 2312 as a whole coincides with a center of the two fourth resonant patches 2322 as a whole. The resonant structure 230 in this implementation can further improve the gain of the second RF signal in the second preset frequency band. It should be noted that the center of the two second resonant patches 2312 as a whole refers to the center of a "whole"

with the two second resonant patches 2312 as a whole, rather than a center of each of the two second resonant patches 2312. For ease of description, the center of the "whole" of the two second resonant patches 2312 is denoted as a third center. The center of the two fourth resonant patches 2322 as a whole refers to the center of a "whole" with the two fourth resonant patches 2322 as a whole, rather than a center of each of the two fourth resonant patches 2322. For ease of description, the center of the "whole" of the two fourth resonant patches 2322 is denoted as the fourth center. The third center coincides with the fourth center.

Figure 16:
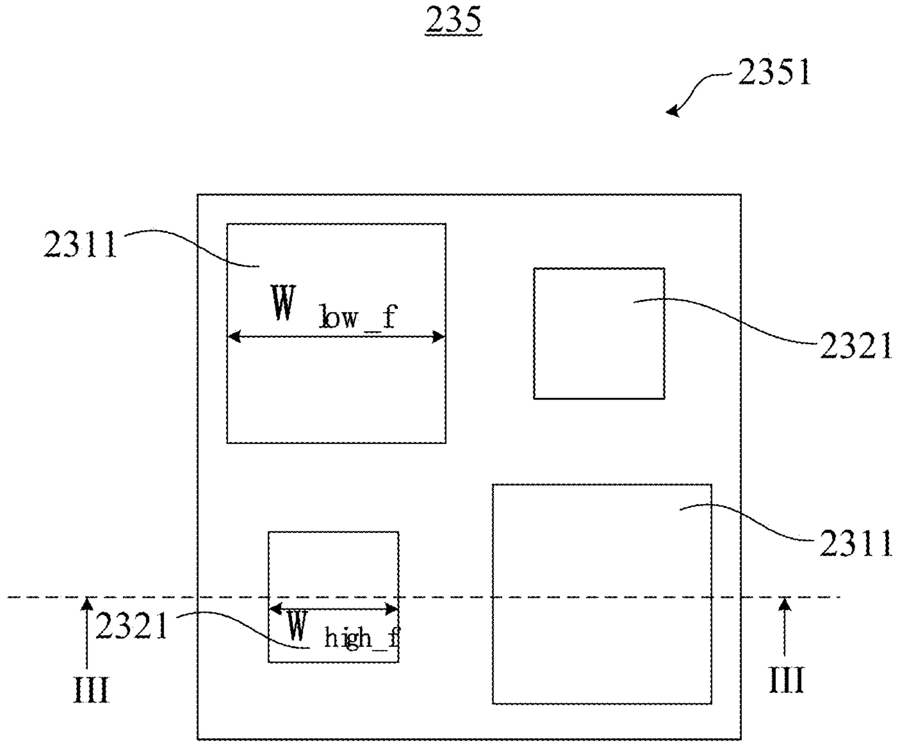
FIG. 16 is a top view of a resonant structure provided in an implementation of the present disclosure.
Figure 17:
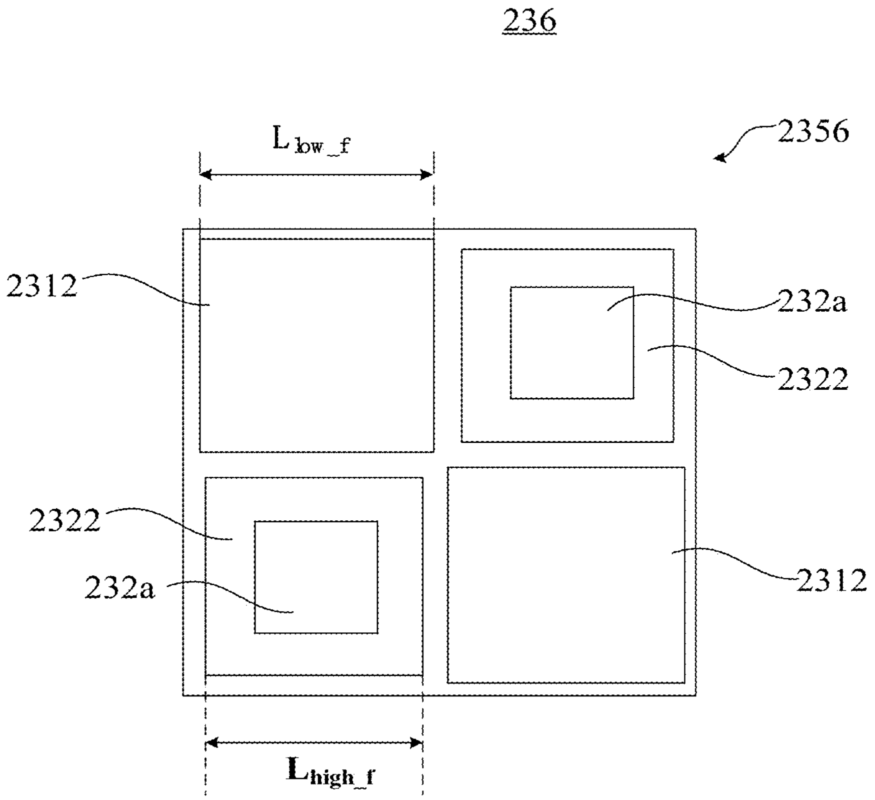
FIG. 17 is a bottom view of the resonant structure illustrated in FIG. 16.
Figure 18:
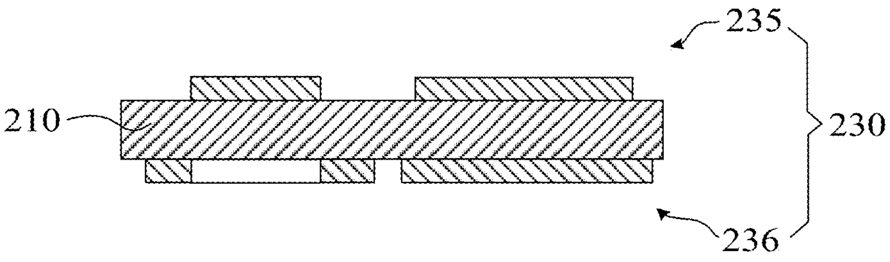
FIG. 18 is a cross-sectional view taken along line III-III in FIG. 16.

Reference is made to FIGS. 16-18, FIG. 16 is a top view of a resonant structure provided in an implementation of the present disclosure, FIG. 17 is a bottom view of the resonant structure illustrated in FIG. 16, and FIG. 18 is a cross-sectional view taken along line III-III in FIG. 16. In this implementation, the resonant structure 230 includes a first resonant layer 235 and a second resonant layer 236 stacked with the first resonant layer 235. It should be noted that, for ease of illustration of a correspondence between the first resonant layer 235 in FIG. 16 and the second resonant layer 236 in FIG. 17, the second resonant layer 236 in FIG. 17 is perspectively illustrated from the same top view angle as that of FIG. 16, and in FIG. 17, only the second resonant layer 236 and the substrate 210 are illustrated while the first resonant layer 235 is not illustrated. The first resonant layer 235 is farther away from the antenna module 100 than the second resonant layer 236. The first resonant layer 235 includes first resonant units 2351 arranged at regular intervals. The first resonant unit 2351 includes a first resonant patch 2311. The second resonant layer 236 includes second resonant units 2356 arranged at regular intervals. The second resonant unit 2356 includes a second resonant patch 2312. The first resonant patch 2311 is opposite to the second resonant patch 2312, and an orthographic projection of the second resonant patch 2312 on a plane where the first resonant patch 2311 is located at least partially overlaps with a region where the first resonant patch 2311 is located. The first resonant patch 2311 and the second resonant patch 2312 are conductive patches, and the following is satisfied:

$$L_{low\_f} \leq W_{low\_f}$$

where $W_{low\_f}$ represents a side length of the first resonant patch 2311, $L_{low\_f}$ represents a side length of the second resonant patch 2312, and the first sub-resonant structure 231 at least includes the first resonant patch 2311 and the second resonant patch 2312.

In this implementation, each of the first resonant patch 2311 and the second resonant patch 2312 is a conductive patch and does not define a hollow structure therein. Each of the first resonant patch 2311 and the second resonant patch 2312 can be in a shape of square, polygon, etc. In the schematic view of this implementation, for example, each of the first resonant patch 2311 and the second resonant patch 2312 is square. A structural form of the first sub-resonant structure 231 in this implementation can improve a gain of the first RF signal in the first preset frequency band.

Optionally, the first resonant unit 2351 includes a third resonant patch 2321 spaced apart from the first resonant patch 2311, a side length of the third resonant patch 2321 is less than the side length of the first resonant patch 2311. The second resonant unit 2356 includes a fourth resonant patch 2322 spaced apart from the second resonant patch 2312. A side length of the fourth resonant patch 2322 is less than the side length of the second resonant patch 2312. The fourth resonant patch 2322 is opposite to the third resonant patch 2321, and an orthographic projection of the fourth resonant patch 2322 on a plane where the third resonant patch 2321 is located at least partially overlaps with a region where the third resonant patch 2321 is located. The third resonant patch 2321 is a conductive patch, the fourth resonant patch 2322 is a conductive patch and defines a second hollow structure 232*a* penetrating two opposite surfaces of the fourth resonant patch 2322, and the following is satisfied:

$$L_{high\_f} \geq W_{high\_f}$$

where $W_{high\_f}$ represents the side length of the third resonant patch 2321, $L_{high\_f}$ represents the side length of the fourth resonant patch 2322, a difference between $L_{high\_f}$ and $W_{high\_f}$ increases as an area of the second hollow structure 232*a* increases, and the second sub-resonant structure 232 at least includes the third resonant patch 2321 and the fourth resonant patch 2322.

In this implementation, each of the third resonant patch 2321 and the fourth resonant patch 2322 can be in a shape of square, polygon, etc. In the schematic view of this implementation, for example, each of the third resonant patch 2321 and the fourth resonant patch 2322 is square, and the second hollow structure 232*a* is square. In other implementations, the second hollow structure 232*a* may also be in a shape of circle, ellipse, triangle, rectangle, hexagon, ring, cross, Jerusalem cross, or the like. A structural form of the second sub-resonant structure 232 in this implementation can improve a gain of the second RF signal in the second preset frequency band. Furthermore, a surface current distribution on the fourth resonant patch 2322 can be changed with the aid of the second hollow structure 232*a* which is defined in the fourth resonant patch 2322 and penetrates the two opposite surfaces of the fourth resonant patch 2322, which in turn increases an electrical length of the fourth resonant patch 2322. That is, for the second RF signal in the second preset frequency band, a size of the fourth resonant patch 2322 with the second hollow structure 232*a* is less than a side length of the fourth resonant patch 2322 without the second hollow structure 232*a*. Moreover, for the second RF signal in the second preset frequency band, the greater a hollow area of the second hollow structure 232*a*, the less the side length of the fourth resonant patch 2322, which is beneficial to improving an integration of the antenna radome 200.

Optionally, the first resonant unit 2351 further includes another first resonant patch 2311 and another third resonant patch 2321. The two first resonant patches 2311 are diagonally arranged and spaced apart from each other. The side length of the third resonant patch 2321 is less than the side length of the first resonant patch 2311. The two third resonant patches 2321 are arranged diagonally and spaced apart from each other. The resonant structure 230 in this implementation can further improve the gain of the first RF signal in the first preset frequency band.

Optionally, a center of the two first resonant patches 2311 as a whole coincides with a center of the two third resonant patches 2321 as a whole. The resonant structure 230 in this implementation can further improve the gain of the first RF signal in the first preset frequency band. For a specific explanation that the center of the two first resonant patches 2311 as a whole coincides with the center of the two third resonant patches 2321 as a whole, reference can be made to the foregoing related description, which will not be repeated herein.

Optionally, the second resonant unit 2356 further includes another second resonant patch 2312 and another fourth resonant patch 2322. The two second resonant patches 2312 are diagonally arranged and spaced apart from each other. The two fourth resonant patches 2322 are diagonally arranged and spaced apart from each other. The resonant structure 230 in this implementation can further improve the gain of the second RF signal in the second preset frequency band.

Optionally, a center of the two second resonant patches 2312 as a whole coincides with a center of the two fourth resonant patches 2322 as a whole. The resonant structure 230 in this implementation can further improve the gain of the second RF signal in the second preset frequency band. For a specific explanation that the center of the two second resonant patches 2312 as a whole coincides with a center of the two fourth resonant patches 2322 as a whole, reference can be made to the foregoing related description, which will not be repeated herein.

Figure 19:
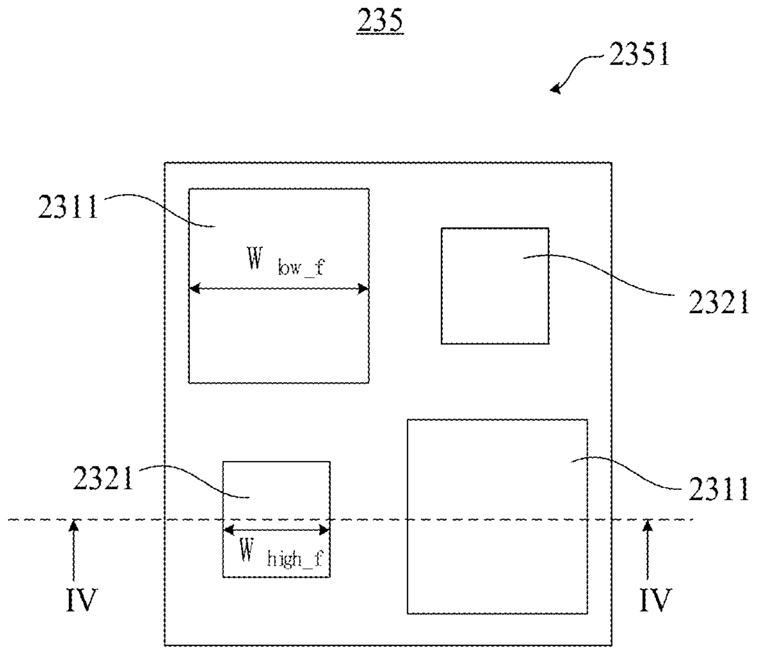
FIG. 19 is a top view of a resonant structure provided in an implementation of the present disclosure.
Figure 20:
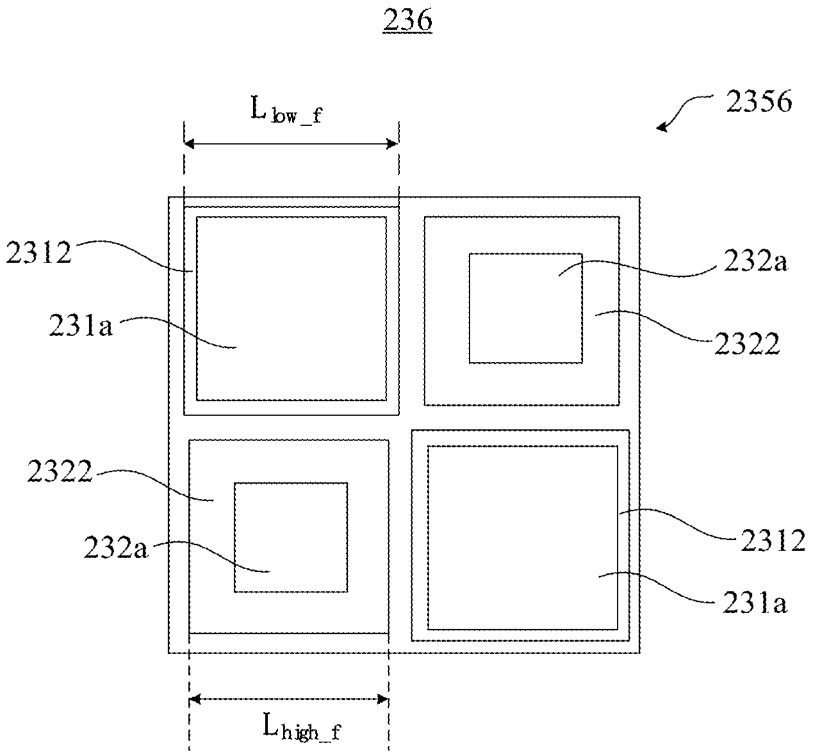
FIG. 20 is a bottom view of the resonant structure illustrated in FIG. 19.
Figure 21:
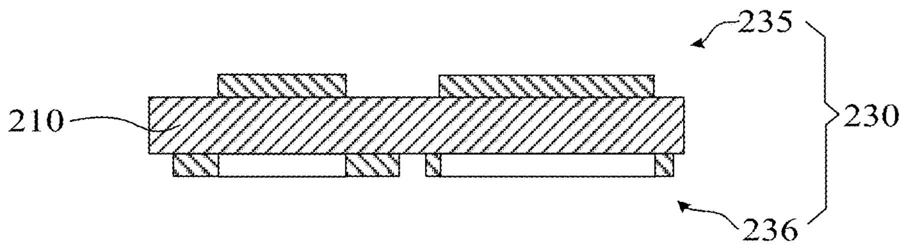
FIG. 21 is a cross-sectional view taken along line IV-IV in FIG. 19.

Reference is made to FIGS. 19-21, FIG. 19 is a top view of a resonant structure provided in an implementation of the present disclosure, FIG. 20 is a bottom view of the resonant structure illustrated in FIG. 19, and FIG. 21 is a cross-sectional view taken along line IV-IV in FIG. 19. In this implementation, the resonant structure 230 includes a first resonant layer 235 and a second resonant layer 236 stacked with the first resonant layer 235. It should be noted that, for ease of illustration of a correspondence between the first resonant layer 235 in FIG. 19 and the second resonant layer 236 in FIG. 20, the second resonant layer 236 in FIG. 20 is perspectively illustrated from the same top view angle as that of FIG. 19, and in FIG. 20, only the second resonant layer 236 and the substrate 210 are illustrated while the first resonant layer 235 is not illustrated. The first resonant layer 235 is farther away from the antenna module 100 than the second resonant layer 236. The first resonant layer 235 includes first resonant units 2351 arranged at regular intervals. The first resonant unit 2351 includes a first resonant patch 2311. The second resonant layer 236 includes second resonant units 2356 arranged at regular intervals. The second resonant unit 2356 includes a second resonant patch 2312. The first resonant patch 2311 is opposite to the second resonant patch 2312, and an orthographic projection of the second resonant patch 2312 on a plane where the first resonant patch 2311 is located at least partially overlaps with a region where the first resonant patch 2311 is located. The first resonant patch 2311 is a conductive patch, the second resonant patch 2312 is a conductive patch and defines a first hollow structure 231*a* penetrating two opposite surfaces of the second resonant patch 2312, and the following is satisfied:

$$L_{low\_f} \geq W_{low\_f}$$

where $W_{low\_f}$ represents a side length of the first resonant patch 2311, $L_{low\_f}$ represents a side length of the second resonant patch 2312, a difference between $L_{low\_f}$ and $W_{low\_f}$ increases as an area of the first hollow structure 231*a* increases, and the first sub-resonant structure 231 at least includes the first resonant patch 2311 and the second resonant patch 2312.

In this implementation, each of the first resonant patch 2311 and the second resonant patch 2312 can be in a shape of square, polygon, etc. In the schematic view of this implementation, for example, each of the first resonant patch 2311 and the second resonant patch 2312 is square, and the first hollow structure 231*a* is square. The first hollow structure 231*a* can refer to the foregoing implementations, which will not be repeated herein. A structural form of the first sub-resonant structure 231 in this implementation can improve a gain of the first RF signal in the first preset frequency band. Furthermore, compared with the second resonant patch 2312 without the first hollow structure 231*a*, a surface current distribution on the second resonant patch 2312 can be changed with the aid of the first hollow structure 231*a* which is defined in the second resonant patch 2312 and penetrates the two opposite surfaces of the second resonant patch 2312, which in turn increases an electrical length of the second resonant patch 2312. That is, for the first RF signal in the first preset frequency band, a size of the second resonant patch 2312 with the first hollow structure 231*a* is less than a side length of the second resonant patch 2312 without the first hollow structure 231*a*. Moreover, for the first RF signal in the first preset frequency band, the greater a hollow area of the first hollow structure 231*a*, the less the side length of the second resonant patch 2312, which is beneficial to improving an integration of the antenna radome 200.

Optionally, the first resonant unit 2351 includes a third resonant patch 2321 spaced apart from the first resonant patch 2311, a side length of the third resonant patch 2321 is less than the side length of the first resonant patch 2311. The second resonant unit 2356 includes a fourth resonant patch 2322 spaced apart from the second resonant patch 2312. A side length of the fourth resonant patch 2322 is less than the side length of the second resonant patch 2312. The fourth resonant patch 2322 is opposite to the third resonant patch 2321, and an orthographic projection of the fourth resonant patch 2322 on a plane where the third resonant patch 2321 is located at least partially overlaps with a region where the third resonant patch 2321 is located. The third resonant patch 2321 is a conductive patch, the fourth resonant patch 2322 is a conductive patch and defines a second hollow structure 232*a* penetrating two opposite surfaces of the fourth resonant patch 2322, and the following is satisfied:

$$L_{high\_f} \geq W_{high\_f}$$

where $W_{high\_f}$ represents the side length of the third resonant patch 2321, $L_{high\_f}$ represents the side length of the fourth resonant patch 2322, a difference between $L_{high\_f}$ and $W_{high\_f}$ increases as an area of the second hollow structure 232*a* increases, and the second sub-resonant structure 232 at least includes the third resonant patch 2321 and the fourth resonant patch 2322. The second hollow structure 232*a* can refer to the foregoing implementations, which will not be repeated herein. A structural form of the second sub-resonant structure 232 in this implementation can improve a gain of the second RF signal in the second preset frequency band. Furthermore, a surface current distribution on the fourth resonant patch 2322 can be changed with the aid of the second hollow structure 232*a* which is defined in the fourth resonant patch 2322 and penetrates the two opposite surfaces of the fourth resonant patch 2322, which in turn increases an electrical length of the fourth resonant patch 2322. That is, for the second RF signal in the second preset frequency band, a size of the fourth resonant patch 2322 with the second hollow structure 232*a* is less than a side length of the fourth resonant patch 2322 without the second hollow structure 232*a*. Moreover, for the second RF signal in the second preset frequency band, the greater a hollow area of the second hollow structure 232*a*, the less the side length of the fourth resonant patch 2322, which is beneficial to improving an integration of the antenna radome 200.

Optionally, the first resonant unit 2351 further includes another first resonant patch 2311 and another third resonant patch 2321. The two first resonant patches 2311 are diagonally arranged and spaced apart from each other. The side length of the third resonant patch 2321 is less than the side length of the first resonant patch 2311. The two third resonant patches 2321 are arranged diagonally and spaced apart from each other. The resonant structure 230 in this implementation can further improve the gain of the first RF signal in the first preset frequency band.

Optionally, a center of the two first resonant patches 2311 as a whole coincides with a center of the two third resonant patches 2321 as a whole. The resonant structure 230 in this implementation can further improve the gain of the first RF signal in the first preset frequency band. For a specific explanation that the center of the two first resonant patches 2311 as a whole coincides with the center of the two third resonant patches 2321 as a whole, reference can be made to the foregoing related description, which will not be repeated herein.

Optionally, the second resonant unit 2356 further includes another second resonant patch 2312 and another fourth resonant patch 2322. The two second resonant patches 2312 are diagonally arranged and spaced apart from each other. The two second resonant patches 2312 are diagonally arranged and spaced apart from each other. The two fourth resonant patches 2322 are diagonally arranged and spaced apart from each other. The resonant structure 230 in this implementation can further improve the gain of the second RF signal in the second preset frequency band.

Optionally, a center of the two second resonant patches 2312 as a whole coincides with a center of the two fourth resonant patches 2322 as a whole. The resonant structure 230 in this implementation can further improve the gain of the second RF signal in the second preset frequency band. For a specific explanation that the center of the two second resonant patches 2312 as a whole coincides with a center of the two fourth resonant patches 2322 as a whole, reference can be made to the foregoing related description, which will not be repeated herein.

Figure 22:
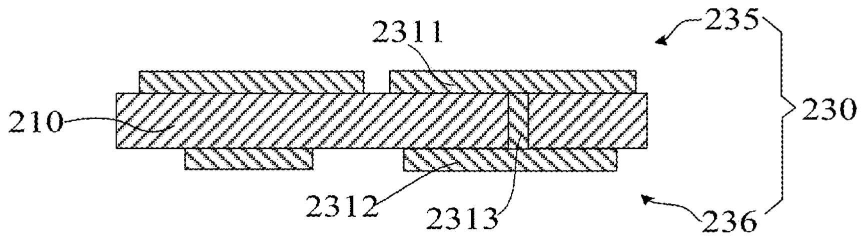
FIG. 22 is a cross-sectional view of a resonant structure provided in an implementation of the present disclosure.

The first resonant patch 2311 and the second resonant patch 2312 described above are connected without a connecting member. Reference is made to FIG. 22, which is a cross-sectional view of a resonant structure provided in an implementation of the present disclosure. The resonant structure 230 provided in this implementation is substantially the same as the resonant structure 230 illustrated in FIG. 13 except that in this implementation, the center of the first resonant patch 2311 is electrically connected with the center of the second resonant patch 2312 via the connecting member 2313. In this implementation, the first resonant patch 2311 is electrically connected with the second resonant patch 2312 via the connecting member 2313, so that a high impedance surface can be formed on the antenna radome 200 and the RF signal cannot propagate along a surface of the antenna radome 200, which can improve a gain and a bandwidth of the first RF signal, and reduce a back lobe, thereby improving a communication quality when the antenna apparatus 10 communicates through the RF signal. Furthermore, the center of the first resonant patch 2311 is electrically connected with the center of the second resonant patch 2312, which can further improve the gain and the bandwidth of the first RF signal, and reduce the back lobe, thereby improving the communication quality when the antenna apparatus 10 communicates through the first RF signal.

Figure 23:
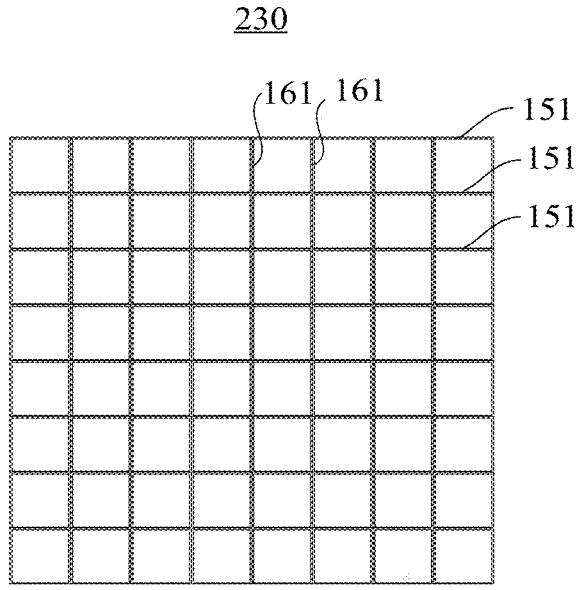
FIG. 23 is a schematic view of a resonant structure provided in an implementation of the present disclosure.

Reference is made to FIG. 23, which is a schematic view of a resonant structure provided in an implementation of the present disclosure. The resonant structure 230 includes multiple first conductive lines 151 spaced apart from one another and multiple second conductive lines 161 spaced apart from one another. The multiple first conductive lines 151 are intersected with the multiple second conductive lines 161, and the multiple first conductive lines 151 are electrically connected with the multiple second conductive lines 161 at intersections.

It can be understood that, the first conductive lines 151 are arranged at intervals in a first direction, and the second conductive lines 161 are arranged at intervals in a second direction. The two first conductive lines 151 arranged at intervals in the first direction intersect with the second conductive lines 161 arranged at intervals in the second direction to form a grid structure. It can be understood that, in an implementation, the first direction is perpendicular to the second direction. In other implementations, the first direction is not perpendicular to the second direction. It can be understood that, for the multiple first conductive lines 151 arranged at intervals in the first direction, a distance between each two adjacent first conductive lines 151 may be the same as or different from each other. Correspondingly, for the multiple second conductive lines 161 arranged at intervals in the second direction, a distance between each two adjacent second conductive lines 161 may be the same as or different from each other. In the schematic view of this implementation, for example, the first direction is perpendicular to the second direction, distances between each two adjacent first conductive lines 151 are equal to each other, and distances between each adjacent two second conductive lines 161 are equal to one another. In the resonant structure in this implementation, the first conductive lines 151 and the second conductive lines 161 form a grid structure. Compared with a resonant structure 230 in a form of conductive patches without grids, a surface current distribution on the resonant structure 230 with the grid structure is different from a surface current distribution of the resonant structure 230 without the grid structure, which in turn increases an electrical length of the resonant structure 230. For an RF signal in a preset frequency band, a size of the resonant structure 230 with the grid structure is less than that of the resonant structure 230 without the grid structure, which is beneficial to improving the integration of the antenna radome 200.

Figure 24:
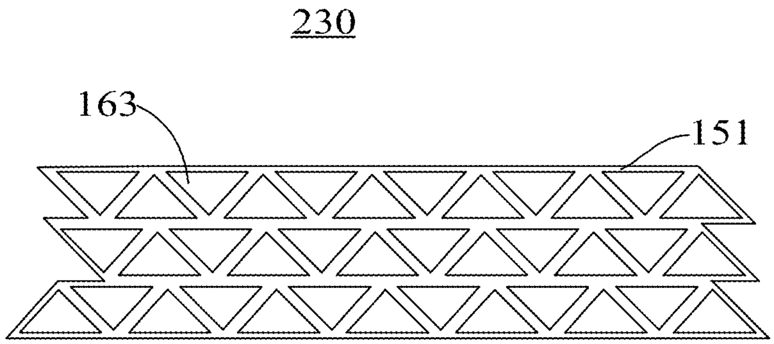
FIG. 24 is a schematic view of a resonant structure provided in an implementation of the present disclosure.

Reference is made to FIG. 24, which is a schematic view illustrating a resonant structure provided in an implementation of the present disclosure. The resonant structure 230 includes multiple conductive grids 163 arranged in arrays, each of the multiple conductive grids 163 is enclosed by at least one conductive line 151, and two adjacent conductive grids 163 at least partially share the at least one conductive line 151. The conductive grid 163 may have, but not limited to, any shape of circle, rectangle, triangle, polygon, and ellipse. In a case that the conductive grid 163 is in a shape of polygon, the number of sides of the conductive grid 163 is a positive integer greater than three. In the schematic view of this implementation, for example, the conductive grid 163 is in a shape of triangle. The resonant structure 230 in this implementation includes multiple conductive grids 163.

Compared with the resonant structure 230 without the conductive grid 163, a surface current distribution on the resonant structure 230 with the grid structure is different from a surface current distribution of the resonant structure 230 without the conductive grid 163, which in turn increases an electrical length of the resonant structure 230. For the RF signal in the preset frequency band, a size of the resonant structure 230 with the conductive grid 163 is less than that of the resonant structure 230 without the conductive grid 163, which is beneficial to improving the integration of the antenna radome 200.

Figure 25:
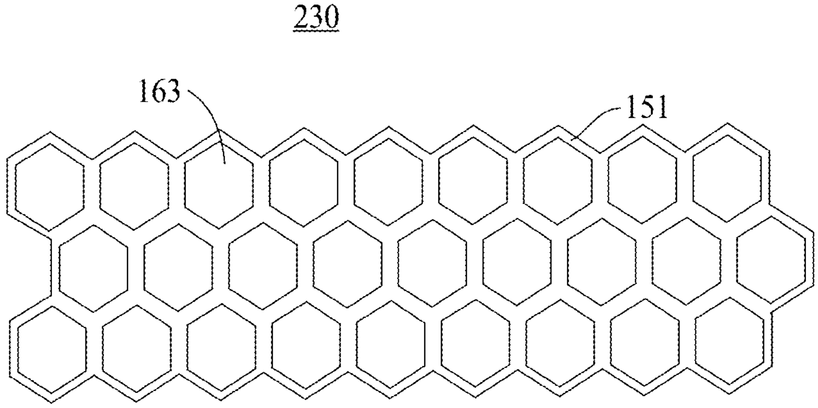
FIG. 25 is a schematic view of a resonant structure provided in an implementation of the present disclosure.

Reference is made to FIG. 25, which is a schematic view of a resonant structure provided in an implementation of the present disclosure. In the schematic view of this implementation, for example, the conductive grid 163 is in a shape of regular hexagon.

Figure 26:
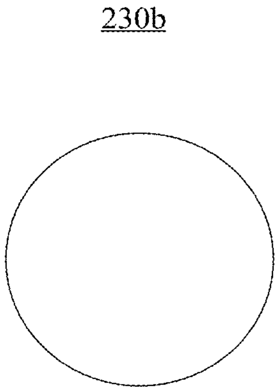
FIGS. 26-33 are schematic structural views of resonant units in a resonant structure.
Figure 27:
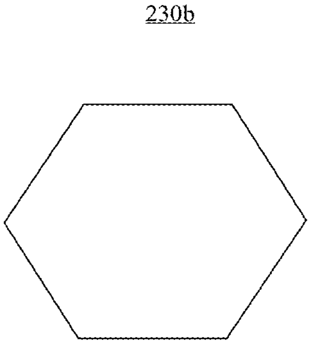
Figure 28:
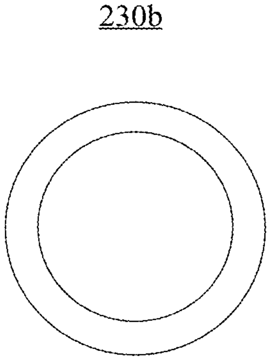
Figure 29:
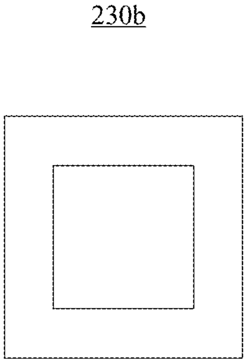
Figure 30:
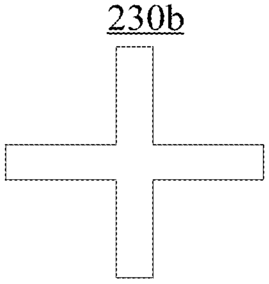
Figure 31:
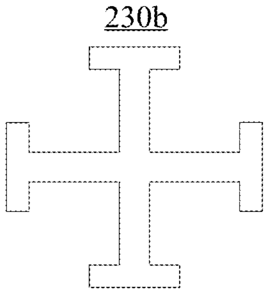
Figure 32:
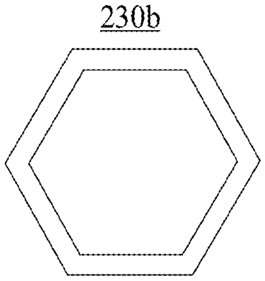
Figure 33:
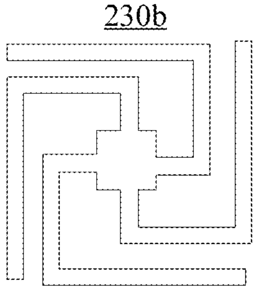

Reference is made to FIGS. 26 to 33, which are schematic views illustrating resonant units in a resonant structure. The resonant unit illustrated in FIG. 26 is a circular patch. The resonant unit illustrated in FIG. 27 is a regular hexagonal patch. The resonant unit 230*b* illustrated in FIGS. 28-33 has a hollow structure, and the resonant unit 230*b* can be the foregoing second resonant patch 2312 having the first hollow structure 231*a*, or the foregoing fourth resonant patch 2322 having the second hollow structure 232*a*.

In an possible implementation, a distance between a radiation surface of the resonant structure 230 facing the antenna module 100 and a radiation surface of the antenna module 100 satisfies:

$$h = \left(\frac{\phi_{R1}}{\pi} - 1\right)\frac{\lambda_1}{4} + N\frac{\lambda_1}{2},$$

where h represents a length of a line segment of a center line of the radiation surface of the antenna module 100 from the radiation surface to a surface of the resonant structure 230 facing the antenna module 100, the center line is a straight line perpendicular to the radiation surface of the antenna module 100, $\phi_{R1}$ represents a difference between a reflection phase and an incident phase brought by the resonant structure 230 to the first RF signal, $\lambda_1$ represents a wavelength of the first RF signal in air, and Nis a positive integer.

When $\phi_{R1}=0$, the resonant structure 230 has in-phase reflection characteristics to the first RF signal, and the minimum value of h is $\lambda_1/4$, thereby significantly reducing the value of h. In this case, for the first RF signal, the distance between the resonant structure 230 and the radiation surface of the antenna module 100 is the minimum distance. When the first RF signal is at 28 GHz, the distance from the resonant structure 230 to the antenna module 100 is about 5.35 mm.

Further, a maximum value $D_{max}$ of a directivity coefficient of the antenna module 100 satisfies:

$$D_{max} = \frac{1 + R_1}{1 - R_1},$$

where $R_1=S_{11}^2$, and $S_{11}$ represents an amplitude of a reflection coefficient of the antenna radome 200 to the first RF signal. When the directivity coefficient of the antenna module 100 has the maximum value, the first RF signal has the best directivity.

Further, the preset frequency band at least includes a full frequency band of 3GPP mmWave.

Figure 34:
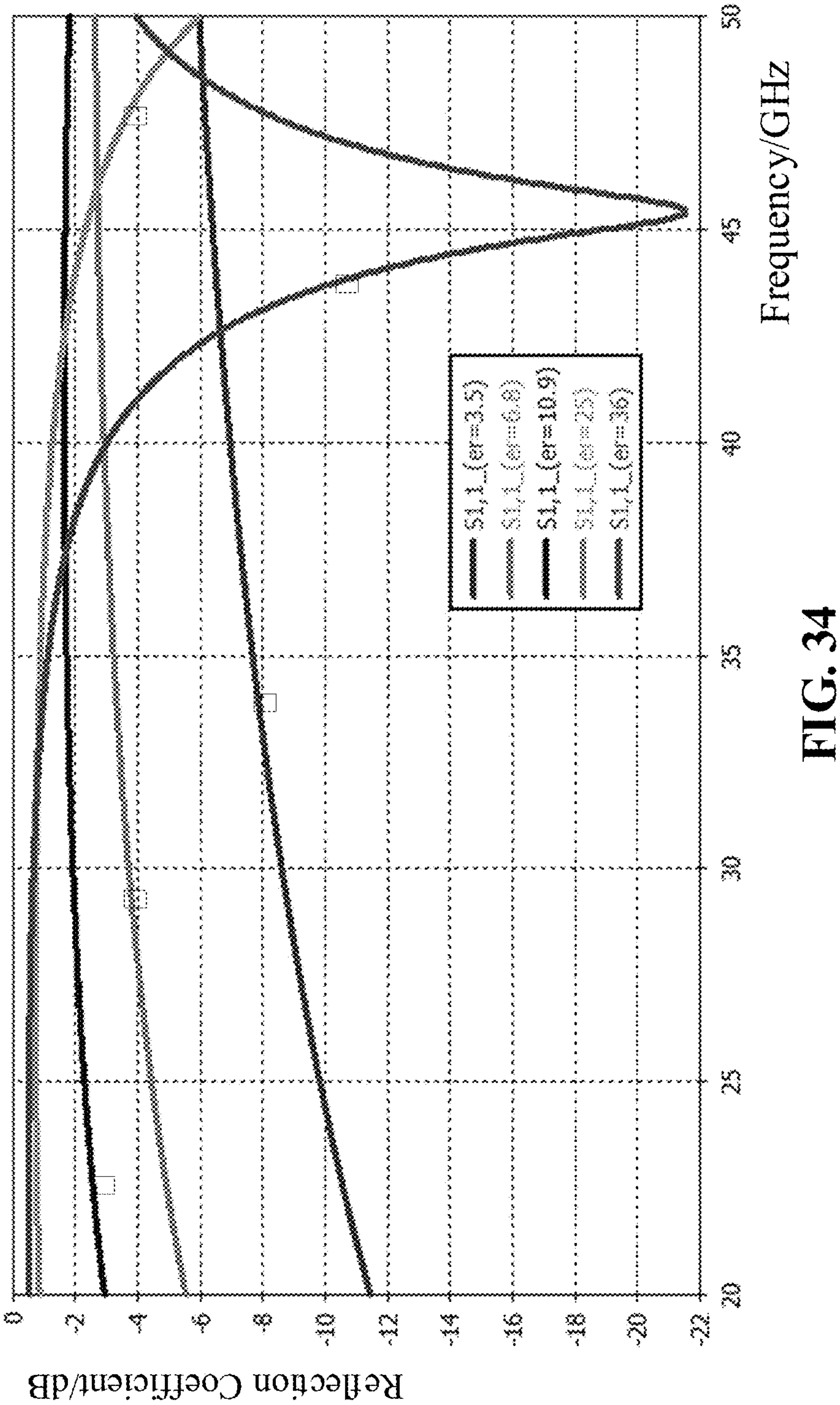
FIG. 34 illustrates reflection coefficient S11 curves corresponding to substrates with different dielectric constants.

Reference can be made to FIG. 34, which illustrates reflection coefficient $S_{11}$ curves corresponding to substrates with different dielectric constants. In this implementation, simulation of the substrate 210 having a thickness of 0.55 mm is carried out. In this schematic diagram, a horizontal axis represents a frequency in units of GHz, and a vertical axis represents a reflection coefficient in units of decibel (dB). In this schematic diagram, curve ① is a variation curve of a reflection coefficient $S_{11}$ with a frequency when the substrate 210 has a dielectric constant of 3.5, curve ② is a variation curve of the reflection coefficient $S_{11}$ with the frequency when the substrate 210 has the dielectric constant of 6.8, curve ③ is a variation curve of the reflection coefficient $S_{11}$ with the frequency when the substrate 210 has the dielectric constant of 10.9, curve ④ is a variation curve of the reflection coefficient $S_{11}$ with the frequency when the substrate 210 has the dielectric constant of 25, curve ⑤ is a variation curve of the reflection coefficient $S_{11}$ with the frequency when the substrate 210 has the dielectric constant of 36. It can be seen from this schematic diagram that reflection coefficients $S_{11}$ of the substrates 210 with different dielectric constants are generally relatively constant.

Figure 35:
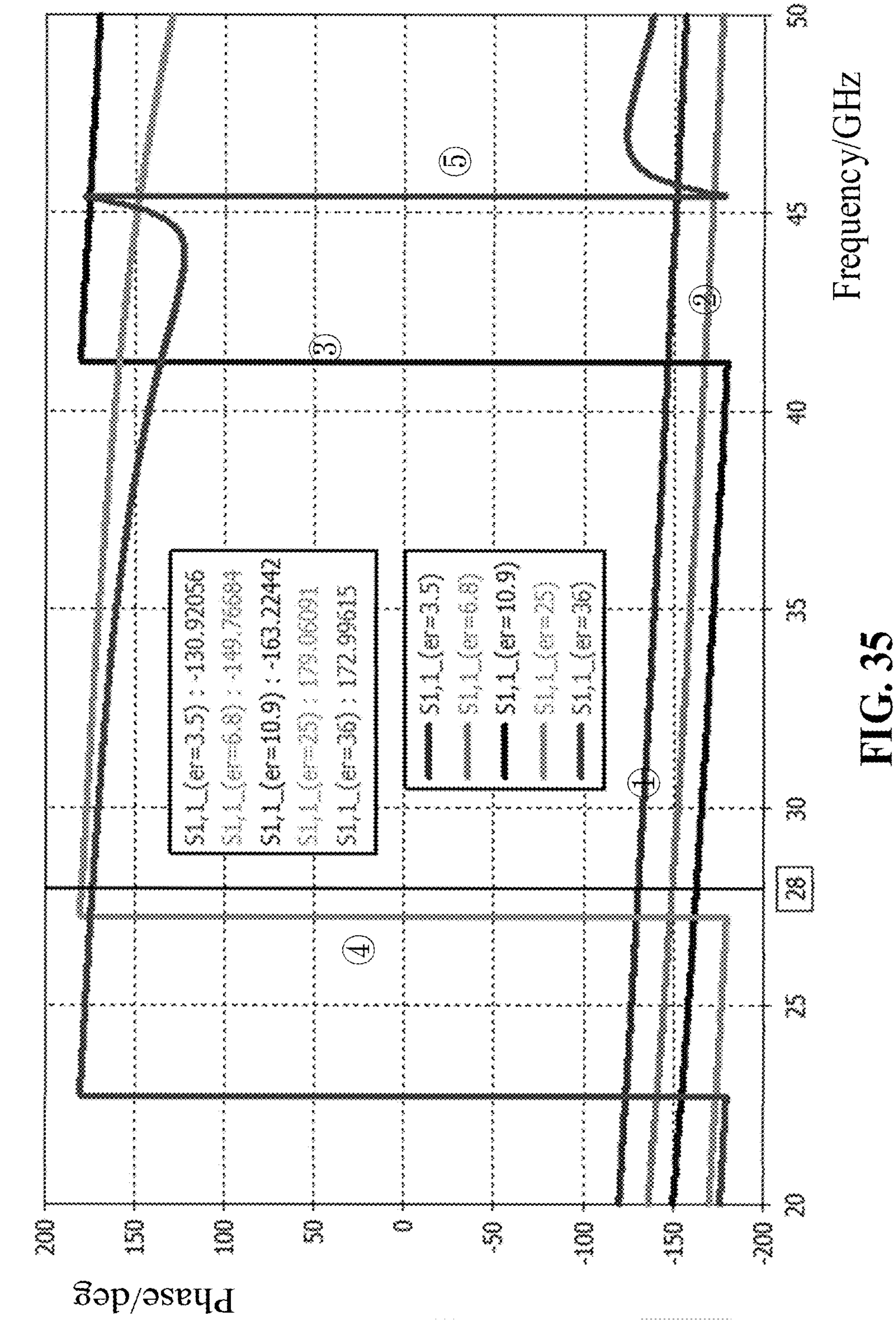
FIG. 35 illustrates reflection phases corresponding to a radio frequency (RF) signal of 28 GHz in reflection phase curves corresponding to substrates with different dielectric constants.

Reference is made to FIG. 35, which illustrates reflection phases corresponding to an RF signal of 28 GHz in reflection phase curves corresponding to substrates with different dielectric constants. In this implementation, simulation of the substrate 210 having a thickness of 0.55 mm is carried out. In this schematic diagram, a horizontal axis represents a frequency in units of GHz, and a vertical axis represents a phase in units of degree (deg). In this schematic diagram, curve ① is a variation curve of a reflection phase with the frequency when the substrate 210 has a dielectric constant of 3.5, curve ② is a variation curve of the reflection phase with the frequency when the substrate 210 has the dielectric constant of 6.8, curve ③ is a variation curve of the reflection phase with the frequency when the substrate 210 has the dielectric constant of 10.9, curve ④ is a variation curve of the reflection phase with the frequency when the substrate 210 has the dielectric constant of 25, curve ⑤ is a variation curve of the reflection phase with the frequency when the substrate 210 has the dielectric constant of 36. In this schematic diagram, when the frequency is 28 GHz, the reflection phase corresponding to each curve falls within the range of −90° ~−180°° or 90° ~180°. That is, the dielectric substrates 210 with different dielectric constants do not satisfy the in-phase reflection characteristics to the RF signal of 28 GHz.

Figure 36:
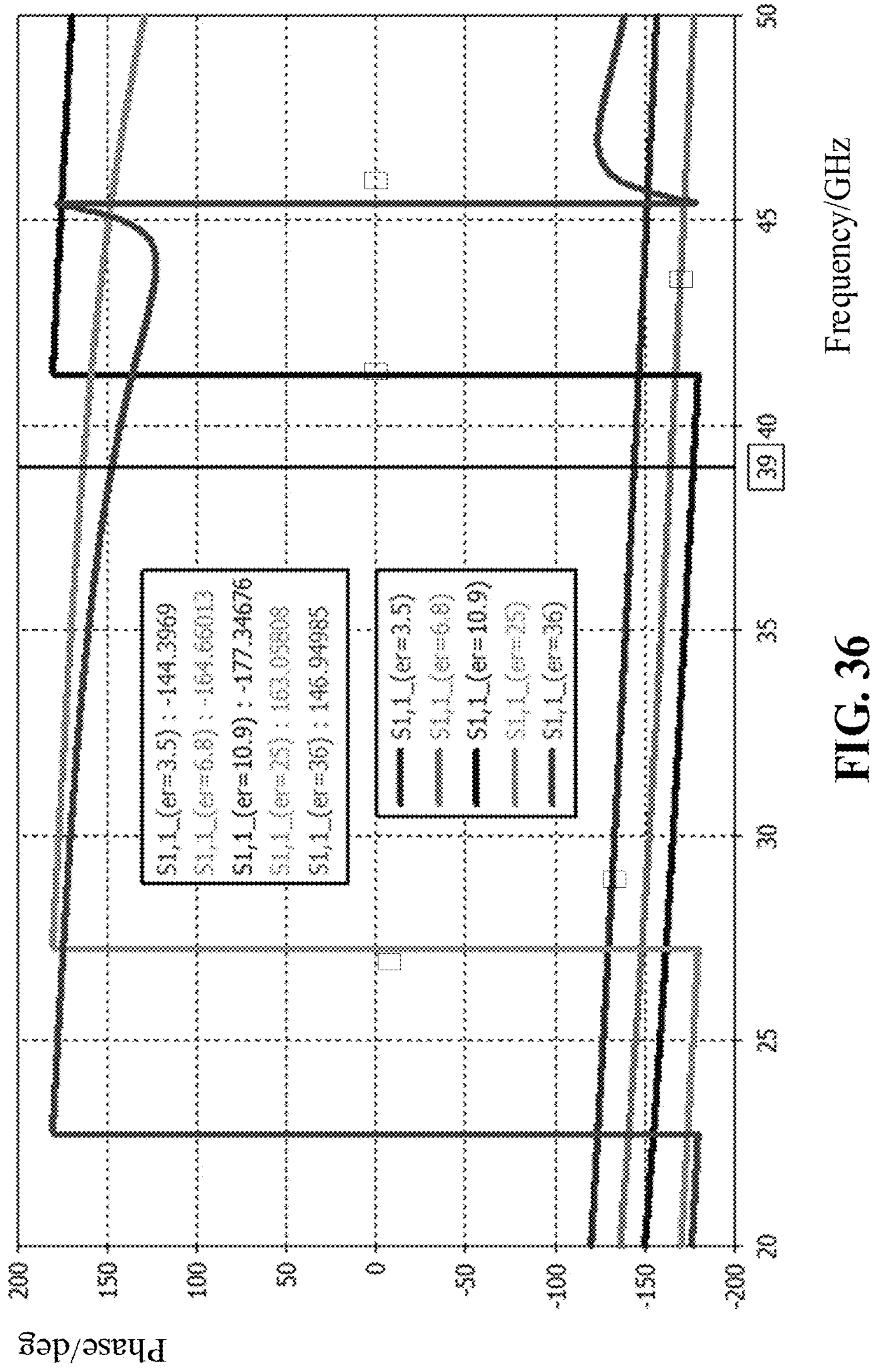
FIG. 36 illustrates the reflection phase corresponding to an RF signal of 39 GHz in the curve of reflection phase corresponding to substrates with different dielectric constants.

Reference is made to FIG. 36, which illustrates reflection phases corresponding to an RF signal of 39 GHz in reflection phase curves corresponding to substrates with different dielectric constants. In this implementation, simulation of the substrate 210 having a thickness of 0.55 mm is carried out. In this schematic diagram, a horizontal axis represents a frequency in units of GHz, and a vertical axis represents a phase in units of degree (deg). In this schematic diagram, curve ① is a variation curve of a reflection phase with the frequency when the substrate 210 has a dielectric constant of 3.5, curve ② is a variation curve of the reflection phase with the frequency when the substrate 210 has the dielectric constant of 6.8, curve ③ is a variation curve of the reflection phase with the frequency when the substrate 210 has the dielectric constant of 10.9, curve ④ is a variation curve of the reflection phase with the frequency when the substrate 210 has the dielectric constant of 25, curve ⑤ is a variation curve of the reflection phase with the frequency when the substrate 210 has the dielectric constant of 36. In this schematic diagram, when the frequency is 39 GHz, the reflection phase corresponding to each curve falls within the range of −90° ~−180°° or 90° ~180°. That is, the dielectric substrates 210 with different dielectric constants do not satisfy the in-phase reflection characteristics to the RF signal of 39 GHz.

Figure 37:
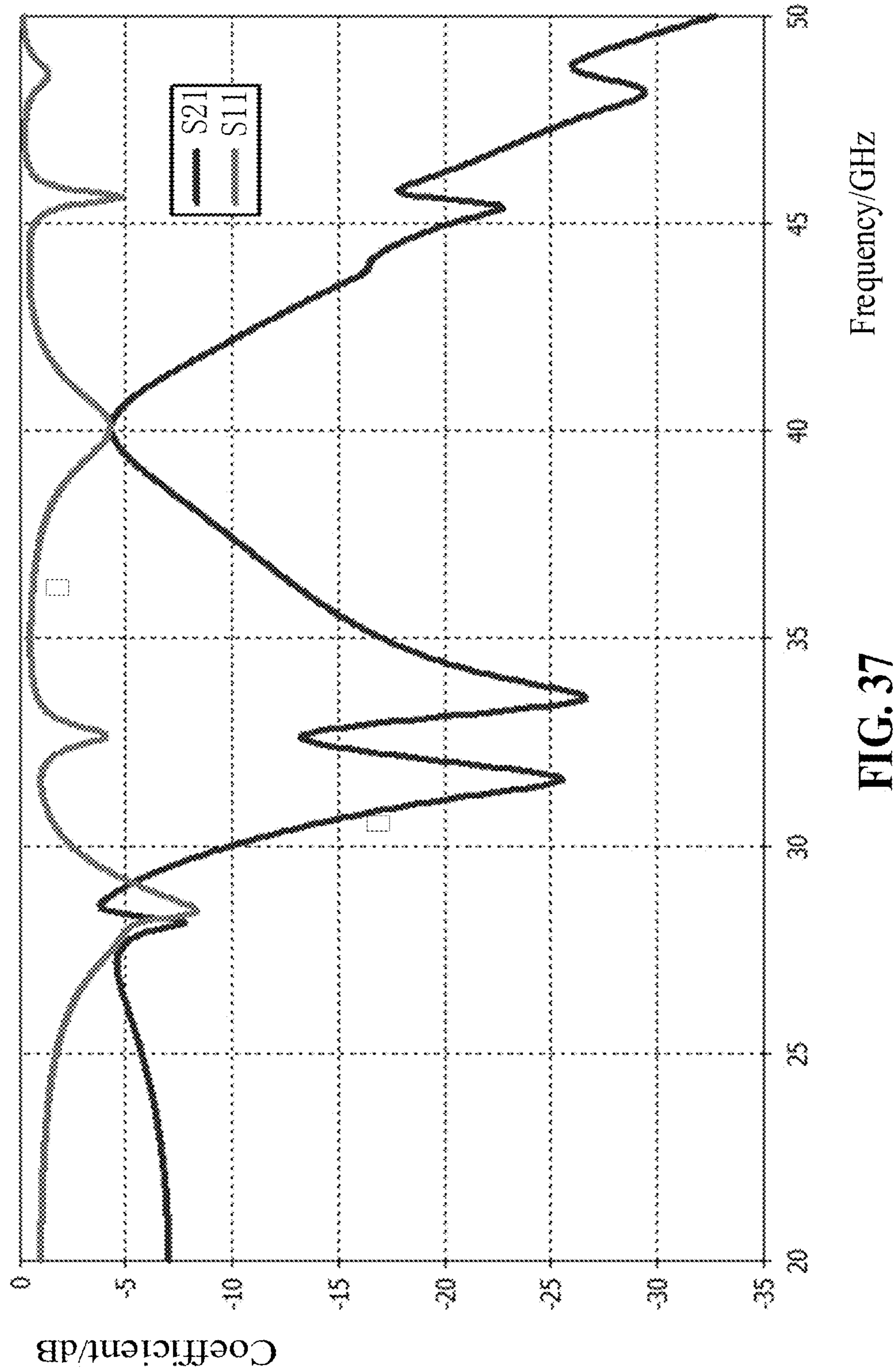
FIG. 37 is a schematic diagram illustrating curves of reflection coefficient S11 and transmission coefficient S12 of an antenna radome provided in the present disclosure.

Reference is made to FIG. 37, which is a schematic diagram illustrating curves of reflection coefficient S11 and transmission coefficient S12 of an antenna radome provided in the present disclosure. In this schematic diagram, a horizontal axis represents a frequency in units of GHz, and a vertical axis represents a phase in units of dB. In this schematic diagram, curve ① is a variation curve of a reflection phase with the frequency, curve ② is a variation curve of a reflection phase with the frequency. In this schematic diagram, for RF signals of 28 GHz and 39 GHz, the transmission coefficient is relatively large and the reflection coefficient is relatively small. That is, the RF signals of 28 GHz and 39 GHz can better pass through the antenna radome 200 provided in the present disclosure, and thus a relatively high transmittance can be achieved.

Figure 38:
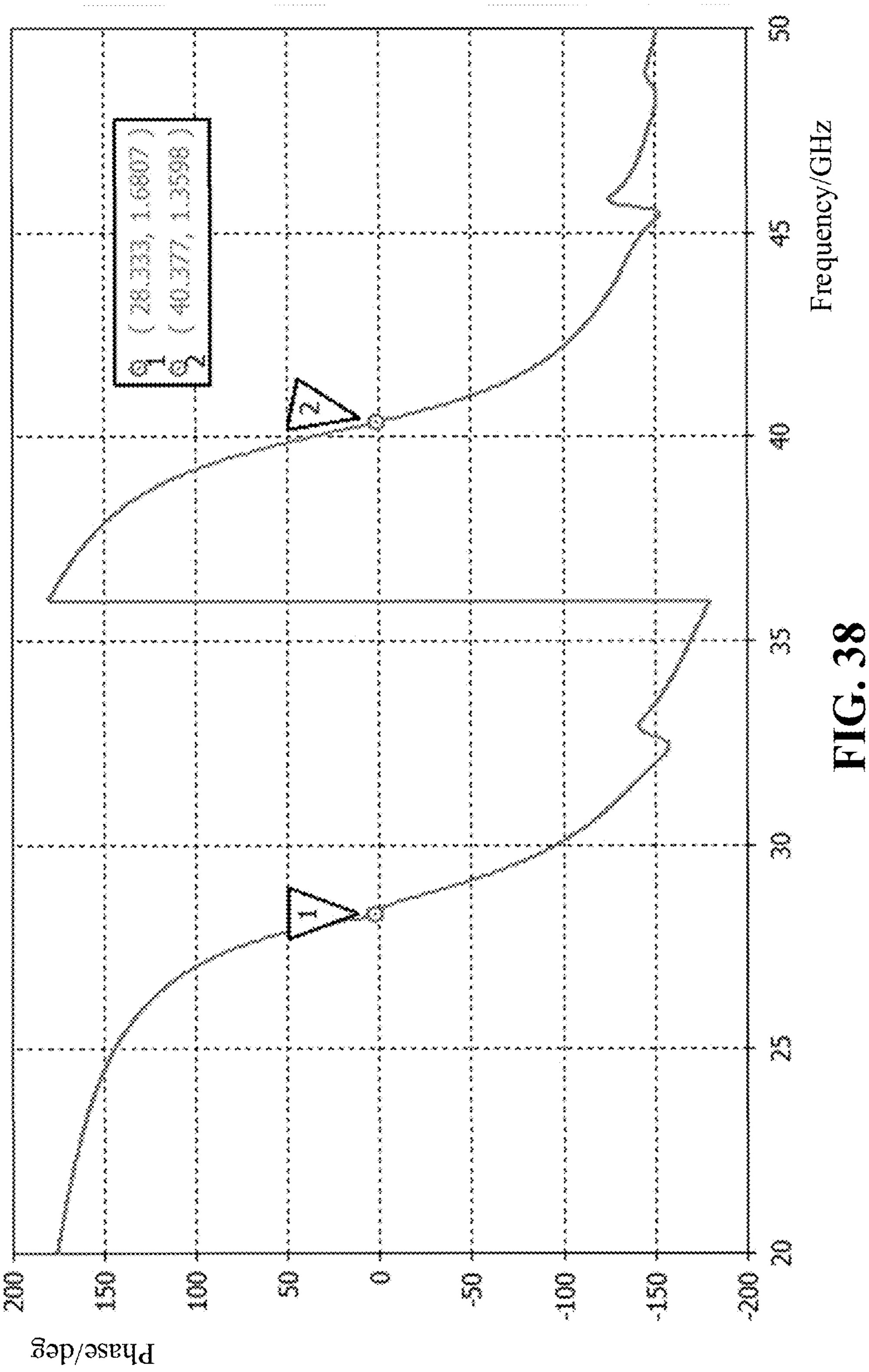
FIG. 38 is a schematic diagram illustrating a reflection phase curve of an antenna radome provided in the present disclosure.

Reference is made to FIG. 38, which is a schematic diagram illustrating a reflection phase curve of an antenna radome provided in the present disclosure. In this schematic diagram, a horizontal axis represents a frequency in units of GHz, and a vertical axis represents a phase in units of degree (deg). It can be seen from this diagram that at a frequency of 28 GHz, a difference between the reflection phase and the incident phase is approximately zero, which satisfies the in-phase reflection characteristics. For each frequency point in band n261 (27.5 GHz~28.35 GHz), the difference between the reflection phase and the incident phase is in the range of −90° ~+90°, that is, the antenna radome 200 has the in-phase reflection characteristics in band n261. For each frequency point in the band n260 (37 GHz~40 GHz), the difference between the reflection phase and the incident phase is in the range of −90° ~+90°, that is, the antenna radome 200 has the in-phase reflection characteristics in band n260.

Figure 39:
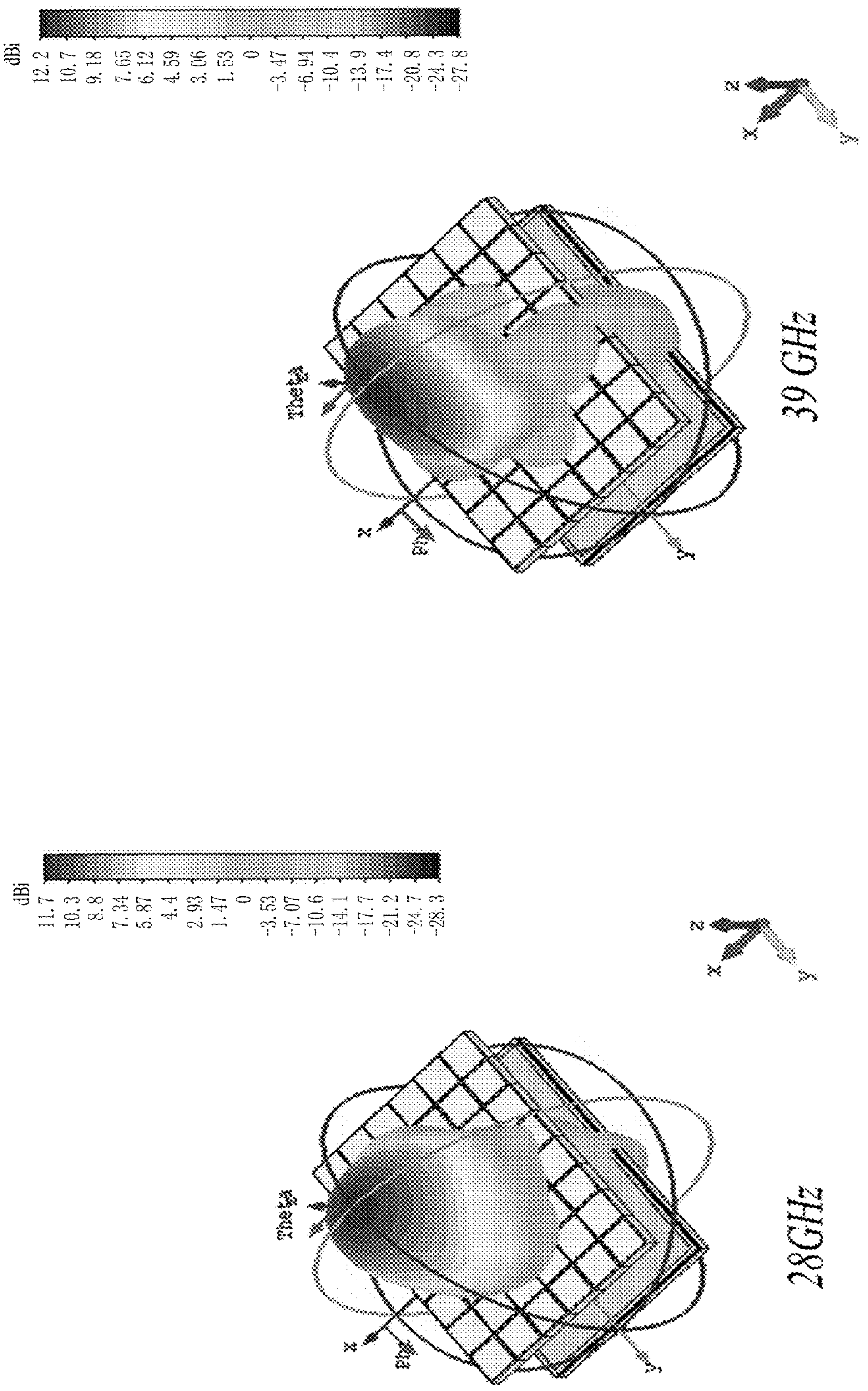
FIG. 39 is a directional pattern at 28 GHz and 39 GHz of an antenna radome provided in the present disclosure.

Reference is made to FIG. 39, which is a directional pattern at 28 GHz and 39 GHz of an antenna radome provided in the present disclosure. The length of the line segment of the center line of the radiation surface of the antenna module 100 from the radiation surface to the surface of the resonant structure 230 facing the antenna module 100 is equal to 2.62 mm (that is, equivalent to a quarter of a wavelength of an RF signal of 28 GHz which propagates in air) is taken as an example for simulation. As can be seen from the pattern of the antenna radome 200 at 28 GHz, the maximum value is 11.7 dBi in the pattern, that is, the gain of the antenna module 100 at 28 GHz is 11.7 dBi, and the antenna module 100 has a relatively large gain at 28 GHz. As can be seen from the pattern of the antenna radome 200 at 39 GHz, the maximum value is 12.2 dBi in the pattern, that is, the gain of the antenna module 100 at 28 GHz is 12.2 dBi, and the antenna module 100 has a relatively large gain at 39 GHz.

Figure 40:
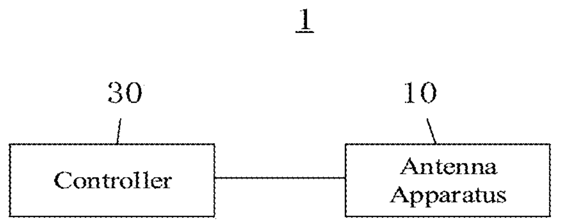
FIG. 40 is a circuit block diagram of an electronic device provided in an implementation of the present disclosure.

An electronic device 1 is further provided in the present disclosure. Reference is made to FIG. 40, which is a circuit block diagram of an electronic device provided in an implementation of the present disclosure. The electronic device 1 includes a controller 30 and an antenna apparatus 10. The antenna apparatus 10 refers to the foregoing description, which will not be repeated herein. The antenna apparatus 10 is electrically connected with the controller 30. The antenna module 100 in the antenna apparatus 10 is configured to emit a first RF signal and a second RF signal under control of the controller 30.

Figure 41:
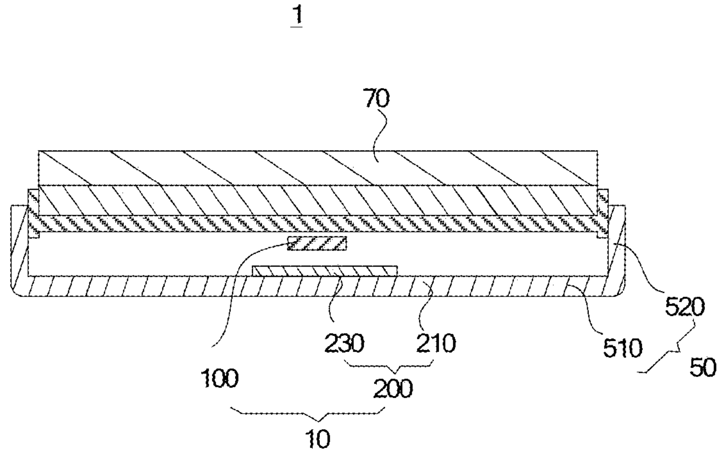
FIG. 41 is a schematic structural view of an electronic device provided in an implementation of the present disclosure.

Reference is made to FIG. 41, which is a schematic structural view of an electronic device provided in an implementation of the present disclosure. The electronic device 1 includes a battery cover 50. The substrate 210 at least includes the battery cover 50. A relationship between the resonant structure 230 and the battery cover 50 can refer to a position relationship between the resonant structure 230 and the foregoing substrate 210, and the substrate 210 described above needs to be replaced with the battery cover 50. For example, the resonant structure 230 can be directly disposed on an inner surface of the battery cover 50; or the resonant structure 230 is attached to the inner surface of the battery cover 50 via a carrier film 220; or the resonant structure 230 is directly disposed on an outer surface of the battery cover 50; or the resonant structure 230 is attached to the outer surface of the battery cover 50 via a carrier film 220; or part of the resonant structure 230 is disposed on the inner surface of the battery cover 50, and part of the resonant structure 230 is disposed on the outer surface of the battery cover 50; or the resonant structure 230 is partially embedded in the battery cover 50. Part of the resonant structure 230 can be disposed on the inner surface of the battery cover 50 as follows: the part of the resonant structure 230 is directly disposed on the inner surface, or the part of the resonant structure 230 is disposed on the inner surface via the carrier film 220. Part of the resonant structure 230 can be disposed on the outer surface of the battery cover 50 as follows: the part of the resonant structure 230 is directly disposed on the outer surface of the battery cover 50, or the part of the resonant structure 230 is disposed on the outer surface of the battery cover 50 via the carrier film 220.

The battery cover 50 generally includes a back plate 510 and a frame 520 bent and connected to a periphery of the back plate 510. The resonant structure 230 may be disposed corresponding to the back plate 510 or corresponding to the frame 520. In this implementation, for example, the resonant structure 230 is disposed corresponding to the back plate 510.

Furthermore, the electronic device 1 in this implementations, also includes a screen 70. The screen 70 is disposed at an opening of the battery cover 50. The screen 70 is configured to display texts, images, videos, etc.

Figure 42:
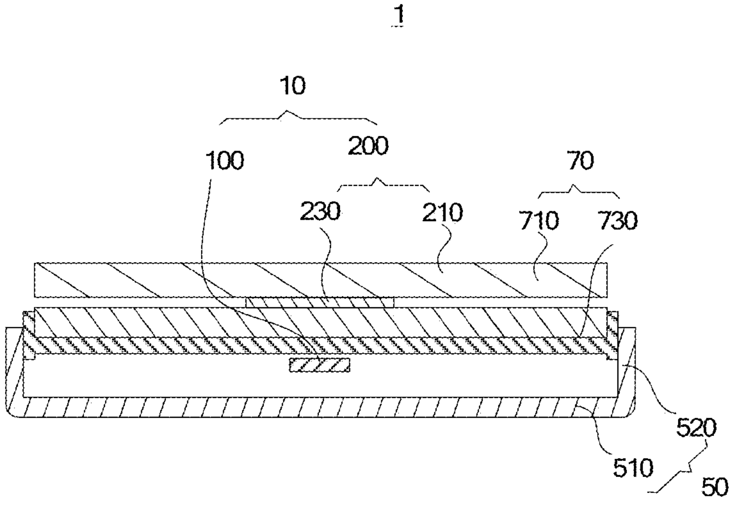
FIG. 42 is a schematic structural view of an electronic device provided in an implementation of the present disclosure.
Figure 43:
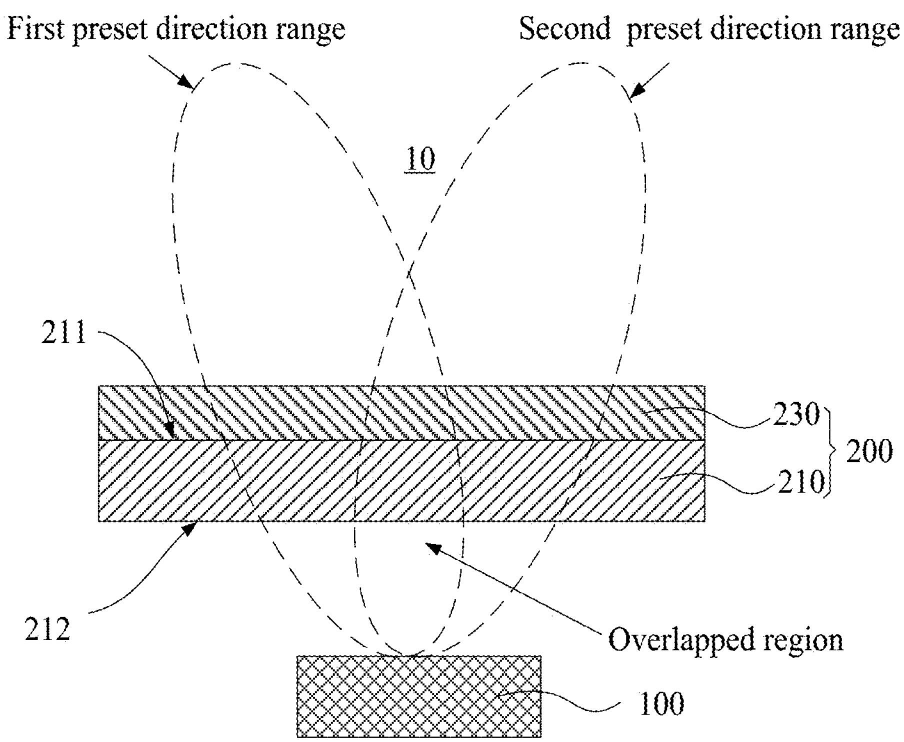
FIG. 43 is a cross-sectional view of an antenna apparatus provided in an implementation of the present disclosure.

Reference is made to FIG. 42, which is a schematic structural view illustrating an electronic device provided in an implementation of the present disclosure. The electronic device 1 further includes a screen 70, the substrate 210 at least includes the screen 70, the screen 70 includes a cover plate 710 and a display module 730 stacked with the cover plate 710, and the resonant structure 230 is located between the cover plate 710 and the display module 730. The display module 730 may be, but is not limited to, a liquid display module, or an organic light-emitting diode (OLED) display module, correspondingly, the screen 70 may be, but is not limited to, a liquid display screen or an OLED display screen. Generally, the display module 730 and the cover plate 710 are separate modules in the screen 70, and the resonant structure 230 is disposed between the cover plate 710 and the display module 730, which can reduce a difficulty of integrating the resonant structure 230 into the screen 70.

Furthermore, the electronic device 1 also includes a battery cover 50, and the screen 70 is disposed on an opening of the battery cover 50. Generally, the battery cover 50 includes a back plate 510 and a frame 520 bendably connected with a periphery of the back plate 510.

In an implementation, the resonant structure 230 is located on the surface of the cover plate 710 facing the display module 730. The resonant structure 230 is located on the surface of the cover plate 710 facing the display module 730, which can reduce difficulty of forming the resonant structure 230 on the cover plate 710, compared to the resonant structure 230 being disposed in the display module 730.

Although the implementations of the present disclosure have been shown and described above, it can be understood that the above implementations are exemplary and cannot be understood as limitations to the present disclosure. Those of ordinary skill in the art can change, amend, replace, and modify the above implementations within the scope of the present disclosure, and these modifications and improvements are also regarded as the protection scope of the present disclosure.

What is claimed is:

1. An antenna apparatus, comprising:

an antenna module configured to receive/emit a first radio frequency (RF) signal in a first preset frequency band in a first preset direction range and receive/emit a second RF signal in a second preset frequency band in a second preset direction range, wherein the first preset frequency band is lower than the second preset frequency band, and the first preset direction range and the second preset direction range have an overlapped region; and an antenna radome spaced apart from the antenna module and comprising a substrate and a resonant structure carried on the substrate, wherein the resonant structure is at least partially located in the overlapped region, and the resonant structure at least has in-phase reflection characteristics to the first RF signal and in-phase reflection characteristics to the second RF signal;

wherein the resonant structure at least satisfies:

$$\left(\frac{\phi_{R1}}{\pi}-1\right)\frac{\lambda_1}{4}+N\frac{\lambda_1}{2}=\left(\frac{\phi_{R2}}{\pi}-1\right)\frac{\lambda_2}{4}+N\frac{\lambda_2}{2}$$

wherein $\phi_{R1}$ represents a difference between a reflection phase and an incident phase brought by the resonant structure to the first RF signal, and $-90° \leq \phi_{R1} < 0°$ and $0° < \phi_{R1} \leq +90°$; $\lambda_1$ represents a wavelength of the first RF signal in air, $\phi_{R2}$ represents a difference between a reflection phase and an incident phase brought by the resonant structure to the second RF signal, $\lambda_2$ represents a wavelength of the second RF signal in air, and N is a positive integer, and $-90° \leq \phi_{R2} < 0°$ and $0° < \phi_{R2} \leq +90°$.

2. The antenna apparatus of claim 1, wherein the resonant structure comprises a first sub-resonant structure and a second sub-resonant structure spaced apart from the first sub-resonant structure, the first sub-resonant structure has in-phase reflection characteristics to the first RF signal, and the second resonant structure has in-phase reflection characteristics to the second RF signal.

3. The antenna apparatus of claim 2, wherein the resonant structure comprises a first resonant layer and a second resonant layer stacked with the first resonant layer, the first resonant layer is farther away from the antenna module than the second resonant layer; and the first resonant layer comprises first resonant units arranged at regular intervals, each of the first resonant units comprises a first resonant patch, the second resonant layer comprises second resonant units arranged at regular intervals, each of the second resonant units comprises a second resonant patch, the first resonant patch and the second resonant patch are disposed on two opposite sides of the substrate, respectively, and an orthographic projection of the second resonant patch on a plane where the first resonant patch is located at least partially overlaps with a region where the first resonant patch is located; wherein one of the following:

the first resonant patch and the second resonant patch are conductive patches, and the following is satisfied: $L_{low\_f} \leq W_{low\_f}$, wherein $W_{low\_f}$ represents a side length of the first resonant patch, $L_{low\_f}$ represents a side length of the second resonant patch, and the first sub-resonant structure at least comprises the first resonant patch and the second resonant patch; or the first resonant patch is a conductive patch, the second resonant patch is a conductive patch and defines a first hollow structure penetrating two opposite surfaces of the second resonant patch, and the following is satisfied: $L_{low\_f} \geq W_{low\_f}$, wherein $W_{low\_f}$ represents the side length of the first resonant patch, $L_{low\_f}$ represents the side length of the second resonant patch, a difference between $W_{low\_f}$ and $L_{low\_f}$ increases as an area of the first hollow structure increases, and the first sub-resonant structure at least comprises the first resonant patch and the second resonant patch.

4. The antenna apparatus of claim 3, wherein the first resonant unit comprises a third resonant patch spaced apart from the first resonant patch, a side length of the third resonant patch is less than the side length of the first resonant patch;

the second resonant unit comprises a fourth resonant patch spaced apart from the second resonant patch, a side length of the fourth resonant patch is less than the side length of the second resonant patch, the fourth resonant patch and the third resonant patch are disposed on two opposite sides of the substrate, respectively, and an orthographic projection of the fourth resonant patch on a plane where the third resonant patch is located at least partially overlaps with a region where the third resonant patch is located; and wherein one of the following:

the third resonant patch and the fourth resonant patch are conductive patches, and the following is satisfied: $L_{high\_f} \leq W_{high\_f}$, wherein $W_{high\_f}$ represents the side length of the third resonant patch, $L_{high\_f}$ represents the side length of the fourth resonant patch, and the second sub-resonant structure at least comprises the third resonant patch and the fourth resonant patch; or the third resonant patch is a conductive patch, the fourth resonant patch is a conductive patch and defines a second hollow structure penetrating two opposite surfaces of the fourth resonant patch, and the following is satisfied: $L_{high\_f} \geq W_{high\_f}$, wherein $W_{high\_f}$ represents the side length of the third resonant patch, $L_{high\_f}$ represents the side length of the fourth resonant patch, a difference between $L_{high\_f}$ and $W_{high\_f}$ increases as an area of the second hollow structure increases, and the second sub-resonant structure at least comprises the third resonant patch and the fourth resonant patch.

5. The antenna apparatus of claim 4, wherein the first resonant unit further comprises another first resonant patch and another third resonant patch, the first resonant patch and the another first resonant patch are diagonally arranged and spaced apart from each other, the side length of the third resonant patch is less than the side length of the first resonant patch, and the third resonant patch and the another third resonant patch are arranged diagonally and spaced apart from each other.

6. The antenna apparatus of claim 5, wherein a center of the first resonant patch and the another first resonant patch as a whole coincides with a center of the third resonant patch and the another third resonant patch as a whole.

7. The antenna apparatus of claim 4, wherein the second resonant unit further comprises another second resonant patch and another fourth resonant patch, the second resonant patch and the another second resonant patch are diagonally arranged and spaced apart from each other, and the fourth resonant patch and the another resonant patch are diagonally arranged and spaced apart from each other.

8. The antenna apparatus of claim 7, wherein a center of the two second resonant patches as a whole coincides with a center of the two fourth resonant patches as a whole.

9. The antenna apparatus of claim 3, wherein a center of the first resonant patch is electrically connected with a center of the second resonant patch via a conductive member.

10. The antenna apparatus of claim 1, wherein the resonant structure comprises a plurality of first conductive lines spaced apart from one another and a plurality of second conductive lines spaced apart from one another, the plurality of first conductive lines are intersected with the plurality of second conductive lines, and the plurality of first conductive lines are electrically connected with the plurality of second conductive lines at intersections.

11. The antenna apparatus of claim 1, wherein the resonant structure comprises a plurality of conductive grids arranged in arrays, each of the plurality of conductive grids is enclosed by at least one conductive line, and two adjacent conductive grids at least partially share the conductive line.

12. The antenna apparatus of claim 1, wherein a distance between a radiation surface of the resonant structure facing the antenna module and a radiation surface of the antenna module satisfies:

$$h = \left(\frac{\phi_{R1}}{\pi} - 1\right)\frac{\lambda_1}{4} + N\frac{\lambda_1}{2},$$

wherein h represents a minimum length of a line segment of a center line of the radiation surface of the antenna module from the radiation surface of the antenna module to a surface of the resonant structure facing the antenna module, the center line is a straight line perpendicular to the radiation surface of the antenna module, $\phi_{R1}$ represents a difference between a reflection phase and an incident phase brought by the resonant structure to the first RF signal, $\lambda_1$ represents a wavelength of the first RF signal in air, and N is equal to one.

13. The antenna apparatus of claim 12, wherein when $\phi_{R1}=0$, h between the radiation surface of the resonant structure facing the antenna module and the radiation surface of the antenna module is equal to $\lambda_1/4$.

14. The antenna apparatus of claim 1, wherein a maximum value $D_{max}$ of a directivity coefficient of the antenna module satisfies:

$$D_{max} = \frac{1 + R_1}{1 - R_1}$$

wherein $R_1=S_{11}^2$, and $S_{11}$ represents an amplitude of a reflection coefficient of the antenna radome to the first RF signal.

15. An electronic device, comprising:

a screen;

a controller; and an antenna apparatus comprising:

an antenna module configured to receive/emit a first radio frequency (RF) signal in a first preset frequency band in a first preset direction range and receive/emit a second RF signal in a second preset frequency band in a second preset direction range, wherein the first preset frequency band is lower than the second preset frequency band, and the first preset direction range and the second preset direction range have an overlapped region; and an antenna radome spaced apart from the antenna module and comprising a substrate and a resonant structure carried on the substrate, wherein the resonant structure is at least partially located in the overlapped region, and the resonant structure at least has in-phase reflection characteristics to the first RF signal and in-phase reflection characteristics to the second RF signal; and wherein the substrate at least comprises the screen, the screen comprises a cover plate and a display module stacked with the cover plate, and the resonant structure is located between the cover plate and the display module; and wherein the antenna apparatus is electrically connected with the controller, and the antenna module in the antenna apparatus is configured to emit a first RF signal and a second RF signal under control of the controller.

16. The electronic device of claim 15, wherein the resonant structure at least satisfies:

$$\left(\frac{\phi_{R1}}{\pi} - 1\right)\frac{\lambda_1}{4} + N\frac{\lambda_1}{2} = \left(\frac{\phi_{R2}}{\pi} - 1\right)\frac{\lambda_2}{4} + N\frac{\lambda_2}{2}$$

wherein $\phi_{R1}$ represents a difference between a reflection phase and an incident phase brought by the resonant structure to the first RF signal, and $-90° \le \phi_{R1} < 0°$ and $0° < \phi_{R1} < +90°$; $\lambda_1$ represents a wavelength of the first RF signal in air, $\phi_{R2}$ represents a difference between a reflection phase and an incident phase brought by the resonant structure to the second RF signal, $\lambda_2$ represents a wavelength of the second RF signal in air, N is a positive integer, and $-90° \le \phi_{R2} < 0°$ and $0° < \phi_{R2} \le +90°$.

17. The electronic device of claim 16, wherein the resonant structure comprises a first sub-resonant structure and a second sub-resonant structure spaced apart from the first sub-resonant structure, the first sub-resonant structure has in-phase reflection characteristics to the first RF signal, and the second resonant structure has in-phase reflection characteristics to the second RF signal.

18. The electronic device of claim 15, comprising a battery cover, and the substrate at least comprising the battery cover, wherein the resonant structure is directly disposed on an inner surface of the battery cover; or the resonant structure is attached to the inner surface of the battery cover via a carrier film; or the resonant structure is directly disposed on an outer surface of the battery cover; or the resonant structure is attached to the outer surface of the battery cover via a carrier film; or part of the resonant structure is disposed on the inner surface of the battery cover, and part of the resonant structure is disposed on the outer surface of the battery cover; or the resonant structure is partially embedded in the battery cover.

* * * * *